(12) United States Patent
Gray et al.

(10) Patent No.: US 10,830,601 B2
(45) Date of Patent: Nov. 10, 2020

(54) USER CONTROLLED DIRECTIONAL INTERFACE

(71) Applicants: Tyrell Gray, Spanish Fork, UT (US);
Brian D. Owens, Plano, TX (US)

(72) Inventors: Tyrell Gray, Spanish Fork, UT (US);
Brian D. Owens, Plano, TX (US)

(*) Notice: Subject to any disclaimer, the term of this patent is extended or adjusted under 35 U.S.C. 154(b) by 364 days.

(21) Appl. No.: 15/350,570

(22) Filed: Nov. 14, 2016

(65) Prior Publication Data
US 2017/0059346 A1 Mar. 2, 2017

Related U.S. Application Data

(63) Continuation of application No. 13/832,939, filed on Mar. 15, 2013, now Pat. No. 9,494,427.

(60) Provisional application No. 61/638,091, filed on Apr. 25, 2012.

(51) Int. Cl.
*G01C 21/36* (2006.01)
*G01C 21/34* (2006.01)
*G01C 21/20* (2006.01)
*G01C 21/00* (2006.01)

(52) U.S. Cl.
CPC ........... *G01C 21/362* (2013.01); *G01C 21/00* (2013.01); *G01C 21/206* (2013.01); *G01C 21/3492* (2013.01); *G01C 21/3629* (2013.01); *G01C 21/3652* (2013.01)

(58) Field of Classification Search
CPC .............. G01C 21/362; G01C 21/3492; G01C 21/3629; G01C 21/3652; G01C 21/206; G01C 21/00
See application file for complete search history.

(56) References Cited

U.S. PATENT DOCUMENTS

| 7,831,387 | B2 | 11/2010 | Golding et al. |
| 8,160,812 | B1* | 4/2012 | Ng ..................... G01C 21/3682 340/995.1 |
| 8,165,801 | B1 | 4/2012 | Jintaseranee et al. |
| 2002/0105481 | A1 | 8/2002 | Kanevsky et al. |
| 2005/0187709 | A1 | 8/2005 | Ohdachi |
| 2005/0222756 | A1* | 10/2005 | Davis ................. G01C 21/3484 701/466 |
| 2006/0199612 | A1* | 9/2006 | Beyer, Jr. .......... H04M 1/72547 455/556.2 |
| 2006/0210958 | A1 | 9/2006 | Rimas-Ribikauskas et al. |
| 2006/0224316 | A1 | 10/2006 | Ishida et al. |

(Continued)

*Primary Examiner* — John T Repsher, III
(74) *Attorney, Agent, or Firm* — Goodhue, Coleman & Owens, P.C.

(57) ABSTRACT

A system and method for providing directional feedback. A wireless connection is established between a first directional interface and one or more directional interfaces. A free form path is received from a user utilizing the first directional interface. The free form path is converted to directional feedback in which the free form path is wrapped to available paths communicated by the first directional interface and the one or more directional interfaces to generate the directional feedback. The directional feedback is sent to the one or more directional interfaces wirelessly connected to die first directional interface. The directional feedback is communicated to one or more users associated with the one or more directional interfaces utilizing user preferences associated with the one or more directional interfaces.

22 Claims, 11 Drawing Sheets

(56) References Cited

U.S. PATENT DOCUMENTS

| | | | |
|---|---|---|---|
| 2007/0156335 A1* | 7/2007 | McBride | G01C 21/20 |
| | | | 701/533 |
| 2007/0162550 A1* | 7/2007 | Rosenberg | H04L 51/04 |
| | | | 709/206 |
| 2007/0260394 A1 | 11/2007 | Dean | |
| 2008/0301643 A1 | 12/2008 | Appleton et al. | |
| 2009/0141118 A1 | 6/2009 | Chun | |
| 2009/0181699 A1 | 7/2009 | Tysowski | |
| 2010/0125410 A1* | 5/2010 | Hicks | B61L 25/025 |
| | | | 701/533 |
| 2011/0022308 A1* | 1/2011 | Britton | G01C 21/3664 |
| | | | 701/533 |
| 2011/0054770 A1* | 3/2011 | Allen | G01C 21/36 |
| | | | 701/532 |
| 2011/0140867 A1 | 6/2011 | Maier | |
| 2011/0178697 A1 | 7/2011 | Mincey et al. | |
| 2011/0306301 A1 | 12/2011 | Lubetzky et al. | |
| 2012/0191343 A1 | 7/2012 | Haleem | |
| 2013/0002489 A1 | 1/2013 | Erad et al. | |
| 2013/0282279 A1 | 10/2013 | Chitre et al. | |
| 2014/0052369 A1 | 2/2014 | Han | |

\* cited by examiner

USER CONTROLLED DIRECTIONAL INTERFACE

RELATED APPLICATION DATA

This patent application claims priority to U.S. provisional application 61/638,091 entitled System and Method for Providing a Directional Interface filed Apr. 25, 2012 and is a continuation of U.S. Pat. No. 9,494,427 both of which are hereby incorporated by reference in their entirety.

BACKGROUND

In recent years, systems and devices for generating maps and providing users directions have increased nearly exponentially. Global positioning information, wireless triangulation, GPS enabled devices, and navigation databases have changed the ways that users receive and utilize mapping and directional information. Existing and developing technologies focus on automatically generated information and interfaces. As many individuals have found out the hard way, automated systems and devices, such as GPS devices are not infallible. As a result, automated systems and devices for generating or consuming mapping information may be inadequate, incorrect, slow to update, expensive, and inconvenient.

SUMMARY

A system and method for providing directional feedback. A wireless connection is established between a first directional interface and one or more directional interfaces. A free form path is received from a user utilizing the first directional interface. The free form path is converted to directional feedback in which the free form path is wrapped to available paths communicated by the first directional interface and the one or more directional interfaces to generate the directional feedback. The directional feedback is sent to the one or more directional interfaces wirelessly connected to the first directional interface. The directional feedback is communicated to one or more users associated with the one or more directional interfaces utilizing user preferences associated with the one or more directional interfaces. Another embodiment provides a processor for executing a set of instructions and a memory for storing the set of instructions. The set of instructions are executed to perform the method(s) described.

Another embodiment provides a directional interface. The mapping interface receives 1) a selection of one or more users that a user utilizing one or more directional interfaces seeks to communicate with and 2) a free form path from the user utilizing the directional interface. The directional interface may further include logic in communication with the display. The logic converts the free form path to directional feedback. The free form path is wrapped to available paths of the mapping interface. The directional feedback is converted to an encoded.

may be operable to convert the selection of each of the number of directional indicators to an encoded signal. The directional interface may further include a transceiver that sends and receives a number of encoded signals including the encoded signal associated with the directional feedback for the one or more directional interfaces.

Yet another embodiment provides a wireless device enabled with a directional interface. The wireless device may include a processor configured to execute a set of instructions and a memory configured to store the set of instructions. The set of instructions may be executed to establish a wireless connection between a directional interface and one or more directional interfaces, receive a free form path from a user utilizing the directional interface, convert the free form path to directional feedback, wherein the free form path is wrapped to available paths communicated by the directional interface and the one or more directional interfaces to generate the directional feedback, send the directional feedback to the one or more directional interfaces wirelessly connected to the directional interface, and communicate the directional feedback to one or more users associated with the one or more directional interfaces utilizing user preferences associated with the one or more directional interfaces.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
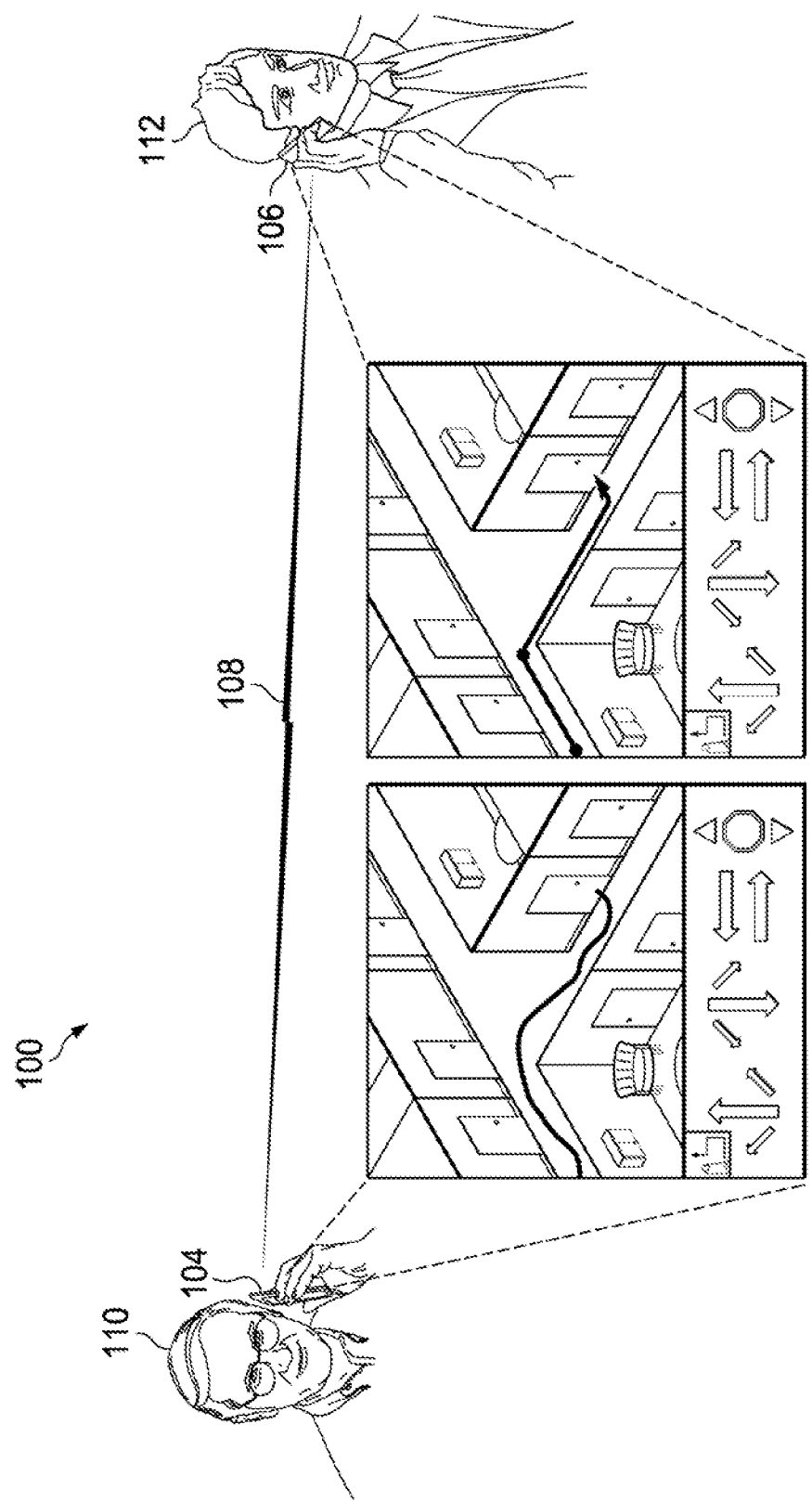
FIG. 1 is a pictorial representation of communications environment in accordance with an illustrative embodiment.

The illustrative embodiments provide a system, method, computer implemented instructions, and directional interface for providing directional indicators or feedback in accordance with an illustrative embodiment. In one embodiment, the directional feedback or selections are generated by users and may be sent in real-time or near real-time. User selections, input, indicators and feedback may be communicated to or through mapping applications, electronic devices, or guidance systems. As a result, the best in new guidance, mapping, and location technology, systems, and software may be enhanced with the adaptability and ingenuity of human feedback, control, and interaction.

The embodiments may be implemented as entirely hardware embodiment, a software embodiment (e.g., program, instructions, 'app', kernel, operating system, script, add-on, etc.), or as a combination of hardware, software, and/or firmware. The illustrative embodiments may be implemented by commercially available, dedicated, or semi-dedicated devices. The described methods, embodiments, components, and features may be utilized or combined in any number of combinations and these diverse embodiments are envisioned. Unless otherwise indicated, as used herein, "or" does not require mutual exclusivity.

The illustrative embodiments may be utilized to receive a user selection of a directional indicator on a first device for communication to one or more other devices. A directional interface may be provided to the user for manual selection or entry (by the user) of a button, touch screen (e.g. free form directions), scroll wheel, peripheral or linked device/accessory, or other selection, such as voice input, tactile input, visual input (i.e. eye tracking), gestures, or other feedback, instruction, or indication. The directional indicator may be utilized to provide directional instructions, commands, information, or feedback to another user, device, or party. For example, a user may trace out free form directions, a path, or route utilizing a touch screen that is communicated and displayed to another user. In one embodiment, the directional indicators (and their respective associations or interpretations) may be set by default or may be configured or programmed by a user.

The directional indicator is communicated to one or more other devices or other parties. The directional indicator may be communicated directly or through one or more networks. In one embodiment, at least a portion of the communications of directional indicators is performed wirelessly. The illustrative embodiments may allow a user to provide directional indicator to another user(s) in real-time. Manual instructions from a human in real-time are much more adaptable and dynamic to circumstances and conditions than existing systems, such as GPS and mapping programs. In one embodiment, the relative information of each user may be communicated to the other user for providing directional feedback relative to location or position information, such as location, heading and direction, speed, altitude, position within a building, or other information or data.

The directional indicators may be communicated for any number of purposes including giving directions in real-time (e.g. speed, direction, etc.), hunting, playing games, driving, geocaching, military applications, outdoor or indoor navigation, work instructions, and other wireless verbal and non-verbal communications. The directional indicators may be adapted to any number of needs of users. For example, a user seeking driving guidance to a store in an unfamiliar area with a number of one-way streams may request specific instructions from the store. Customized instructions may be then be provided to the user in real-time to reach the store. The instructions may be contrary to those provided by automatic mapping systems, but may be utilized for convenience and based on human knowledge of the area or circumstances that the automated systems may not be able to account for in real-time (e.g. weather conditions, instructions, incorrect mapping information, car accidents, shorter routes, etc.). Automated systems may never be able to fully account for circumstances and events that occur in real-time in the say way that individual users are able to.

The directional interface may be utilized for outdoor mapping or for internal mapping within facilities, buildings, structures, or underground. Locations of the respective users and other relevant landmarks, individuals, or structures may be determined utilizing one or more technologies, such as global positioning satellites, wireless triangulation (e.g. cell phones, Bluetooth, Wi-Fi, WiMAX, light signals, etc.), inertial navigation, beacon based systems, mesh network mapping, initial location based projections, Wi-Fi fingerprinting, sensors (e.g. accelerometers, gyroscopes, compasses, barometers, step counters, radar, etc.), or MEMs dead reckoning. In one embodiment, the one or more communicating devices may aggregate or transition between various location detection methods for accuracy or based on availability. For example, the directional interface may be used for remote areas, heavily networked areas, and indoors utilizing high-accuracy indoor positioning (HAIP).

Multiple open or proprietary systems, databases, and maps may be utilized to determine the location of the user. For example, GPS information may be mapped against known building floor plans to show the user's position (latitude, longitude, altitude) within a building. The various embodiments may be very useful in airports, train stations, shopping malls, convention centers, hotels, and expos.

In one embodiment, the directional interfacing systems herein described may be utilized for exchanging directional instructions or feedback. The directional instructions may be given while the users are carrying on a voice conversation or as a stand-alone communications. For example, a dedicated communications session including one-way or two-way communication of directional indicators, maps, layouts, text, audio, video, or other communications. In one embodiment, the users may transition between modes of communications based on changing needs or circumstances.

The communications may occur between dedicated applications or devices or as part of a social network, browser, browser add-on, mapping application, or so forth User communications preferences, contacts, or settings may control how the users interact. In one embodiment, one user may send a request to another user for directional feedback that may be utilized to activate a directional interface for one or more of the users. For example, the user may be required to accept the request before an application linking the users is opened. In one embodiment, the communications sessions, requests, or authorization may expire after a predefined amount of time, such as ten minutes, five minutes without any communications, one hour, or so forth. In one embodiment, a request may include a randomly assigned identifier that may be utilized to generate a communications session between two or more devices. The communications session may validate that one or more of the users has authorized sharing of locations and real-time communications. Communications sessions may also be unlimited or limited based on user preferences, settings, criteria, thresholds, or parameters set by the users. Validating a communications session may be particularly useful for individuals that are communicating on a one-time basis (e.g. business transaction, delivery, etc.). In another embodiments communications sessions may be initialized utilizing personal information (e.g. name, username, cell phone number, email address, etc.), contacts, social network friends or contacts, or other identifying information.

In one embodiment, one user may send an invitation to another user to "follow me". At that point the mapping data regarding one user may be sent to another. For example, a blue line (as utilized by mapping systems to provide instructions) may indicate the first user's previous location and ongoing heading and may be communicated to and displayed to the second user for following, catching up with, or intercepting the first user. The follow me configuration may be particularly useful for users following each other in urban areas where stop lights and traffic may temporarily separate them. The mapping system of the second user may also employ automatic driving instructions to follow the path of the first user.

The directional interface may be utilized with any number of existing or developing computing, communications, or electronic components, devices, or systems. For example, the directional interface may be utilized or integrated with Google glasses, smart glass, miniature projectors, imaging systems, cell phones, personal digital assistants, tablets, e-readers, portable gaming systems, mp3 players, global positioning system (e.g. personal device, vehicle system, military device, etc.), smart appliance, laptops, personal radios, hybrid computers, or other similar device. In one embodiment, the directional interface may compensate for delays or latency in sending and receiving headings (i.e. location, direction of travel, speed) for each of the users so that directions may be communicated in a timely manner.

Turning now to FIG. 1 illustrating a communications environment 100 in accordance with an illustrative embodiment. The communications environment 100 illustrates direct wireless communication between wireless devices 104 and 106 through a wireless signal 108. The wireless devices 104 and 106 may be utilized by multiple users, which may include a user 110 utilizing the wireless device 104, and a user 112 utilizing the wireless device 106.

The wireless devices 104 and 106 may represent cell phones, radios, smart phones, a BlackBerry® device, an iPhone®, iPad®, a Windows® Mobile phone, an Android® phone, GPS devices, laptops, MP3 players, e-readers, tablet computers, or other computing or communications devices. The wireless devices 104 and 106 may include devices with dedicated hardware and/or software for providing directional feedback.

The wireless signal 108 may represent a radio frequency, light, or wireless signal, such as a cellular signal (GSM, PCS, Digital, etc.), designated or allowed radio signal or spectrum (3 Hz-30 GHz, family radio service (FRS), general mobile radio service (GMRS), multi-use radio service (MURS), ham, Citizen's Band (CB), ultra-high frequency (UHF)), Bluetooth, ZigBee, ultra-wideband, wireless USB, infrared, wireless local area network (WLAN), Wi-Fi, WiMAX, proprietary standards, or other radio frequency signals whether analog or digital that may be utilized to communicate a signal. Any number of FCC, FDA, IEEE, ISO, CEN, ETSI, ARIB, ANSI, or IEC approved or developing communications standards, signals, or protocols. The wireless signals may or may not require a FCC or other governmental or industry applicable license. In one embodiment, each frequency within a band may be associated with a directional indicator. In another embodiment, the wireless signal 108 may include packets, encryption, or other encapsulated signals or may represent frequency broadcasts.

In one embodiment, an application may be executed by the wireless devices 104 and 106 to perform the communications as herein described. In other embodiments, the operating system, kernel, an application specific integrated circuit (ASIC), field programmable gate array (FPGA), or other hardware (e.g. digital logic) of the wireless devices 104 and 106 may perform the communications, features, and functions as described.

The wireless devices 104 and 106 communicate to share directions uni-directionally or bi-directionally between the users 110 and 112. The directions are received through the wireless signal 108. In one embodiment, the wireless devices 104 or 106 receive a user selection, such as North, South, East, West (or a combination thereof e.g., Northeast, Northwest, Southeast), forward, back, left, right, diagonals, or other directions, instructions, commands, data, words, or information. The directions may also be a free form communication, such as a free form line drawing input utilizing a touch screen and imposed over a street map. The directional indicators may be receive for two dimensions (e.g. driving directions) or for three dimensions (e.g. goggles, heads up displays for aircraft, directions within a multi-level building, etc.).

The users 110 and 112 may agree upon or designated custom meanings or definitions for the directional indicators (e.g. speed up, slow down, stop, climb up, climb down, etc.). The directions may be received by the user selecting a directional indicator associated with a direction or command. The directional indicators may be received or displayed as dedicated hard buttons, soft buttons, icons, gesturing or motion tracking, eye motion, tactile feedback, illuminated indicators, a track ball, a scroll wheel, a touch screen, switches, or other selection or interface components. The selection of the directional indicator by a user on one device, such as the user 104 on the wireless device 104, is communicated to one or more other devices, such as the user 112 on the wireless device 106.

The signal 108 may represent one or more wireless signals, standards, protocols, or formats. In one embodiment, the signal 108 is an analog signal. For example, each directional indicator may correspond to a specific analog signal or frequency. A transceiver of the wireless devices 104 and 106 may communicate the signal frequency associated with the directional indicator in response to the user selection or pressing the directional indicator. Once the user releases the directional indicator, the signal 108 is no longer transmitted from the transmitting device to the receiving device.

In another embodiment, the signal 108 may be a modulated signal that may include a directional indicator (or other data or information) that is modulated in the carrier signal. A modulated signal may be configured to send multiple directional indicators sequentially or simultaneously. The signal 108 may include a changing or varying amplitude, phase, and frequency to be communicated as a modulated signal. For example, the wireless devices 104 and 106 may utilize frequency division multiplexing, frequency modulation, amplitude modulation, spread spectrum, ultra-wideband, OFDM, or single-sideband modulation, or other modulation systems and methods known in the art (which may or may not utilize carrier signals).

In another embodiment, the signal 108 is a digital signal. In one embodiment, the digital signal includes encoding or a waveform that indicates the selected directional indicator. In other embodiments, the digital signal may include packets, encapsulation, or formats that are encapsulated or formatted by the sending device and then extracted, converted, or formatted by the receiving device to communicate the selected directional indicator to the receiving user.

The signal 108 communicating the direction indicators may utilize any number of possible combinations including digital data in a digital signal, analog data in a digital signal, digital data in an analog signal, and analog data in an analog signal. The signal 108 may include any number of encoding schemes, data rates, modulation rates, timing, sampling, comparison, signal spectrum, bandwidth configurations, binary logic, filters, clocking, security, encryption, scrambling, phase shifting, conversion, digitization, CODECs, and error detection to ensure that the directional indicators are effectively communicated between the wireless devices 104 and 106.

In one embodiment, the signal 108 is communicated directly between the wireless devices 104 and 106. However, the signal 108 may be communicated through any number of routers, repeaters, extenders, repeaters, or other intermediate devices. As previously mentioned, the signal 108 may be a Bluetooth, GSM, GPRS, GMRS, 3G, 4G (LTE), PCS, CDMA, Wi-Fi, Bluetooth, ultra-wide band, WiMAX, professional land mobile radio (LMR), specialized mobile radio (SMR), family radio services, citizen band (CB), or other wireless signal as is known in the art.

Figure 2:
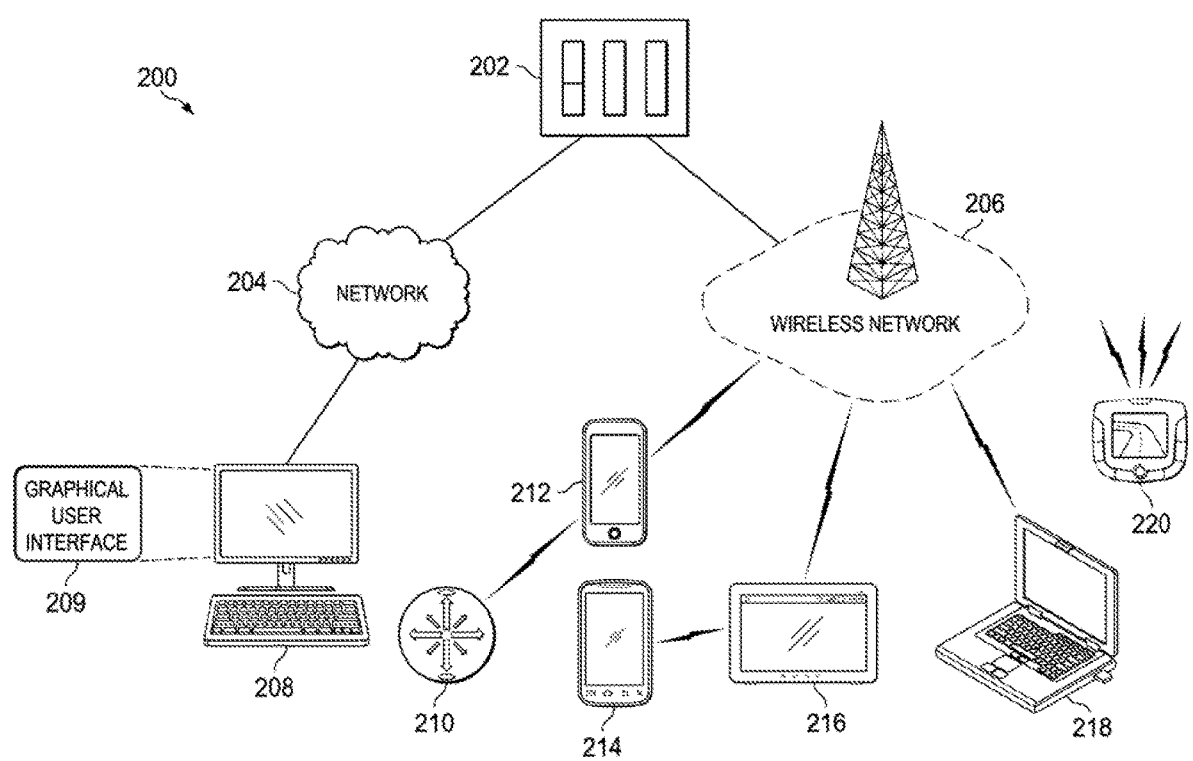
FIG. 2 is a pictorial representation of a communications environments in accordance with an illustrative embodiment.

FIG. 2 is a pictorial representation of a communications environment 200 in accordance with an illustrative embodiment. The communications environment 200 illustrates additional communications of directional indicators utilizing alternative devices, systems, equipment, and applications. As described herein, the directional communications or feedback may be carried out between any number of devices, systems, components, equipment, or networks. In one embodiment, directional communications are implemented by specialized hardware (e.g. application specific integrated circuit (ASIC), communications enabled field programmable gate array (FPGA), etc.) or are implemented by one or more processors executing an app, program, or set of instructions. In one embodiment, the communications environment 200 may include a communications management system 202, a network 204, a wireless network 206, a computer 208, a graphical user interface 209, a directional interface 210, wireless devices 212 and 214, tablet 216, a laptop 218, and a global positioning system 220.

The communications environment 200 may include any number of elements, devices, components, systems, and equipment in addition to other computing and communications devices not specifically described herein for purposes of simplicity. The different elements and components of the communications environment 200 may communicate using wireless communications as previously described, such as satellite connections, global positioning signals, WiFi_33, WiMAX, CDMA, GSM, PCS, or hardwired connections, such as fiber optics, T1, cable, DSL, high speed trunks, powerline networks, and telephone lines. Communications within the communications environment 300 may occur on any number of networks. In one embodiment, the network 204 may include wireless networks, data or packet networks (i.e. the Internet), computer networks (e.g. Ethernet, personal area network, local area network, Metropolitan area network, campus area network, wide area network, etc.) cable networks, satellite networks, private networks, community networks, cloud networks and environments, publicly switched telephone networks (PSTN), or other types of communication networks.

The network 204 is infrastructure for sending and receiving directional indicators, interfaces, webpages, portals, messages, data, packets, and signals according to one or more designated formats, standards, and protocols. The network 204 may be any type of network including a public network, a wide area network, a local area network, one or more private networks, and the Internet. In one embodiment, the network 204 may also include a telephone network such as the public switched telephone network (PSTN) and one or more cellular voice networks and/or wireless data networks, such as the wireless network 206. The network 204 or wireless network 206 may include a number of network nodes (not depicted) such as routers, network access points/gateways, DNS servers, proxy servers, and other network nodes for assisting in routing of data and voice communications between devices.

The wireless network 206 is similarly infrastructure for sending and receiving wireless signals, such as directional indicators. The networks of the communications environment 200 may represent a single communication service provider or multiple communications services providers.

The features, services, and processes of the illustrative embodiments may be implemented by one or more elements of the communications environment 200 independently or as a networked implementation.

The communications management system 202 is one or more devices, infrastructure, and platforms utilized to enable, initiate, route, and manage directional communications between the devices and components of the communications system 202. The communications management system 202 may include one or more devices networked to manage the network 204 or wireless network 206. For example, the communications management system 202 may include any number of servers (i.e. application, database, name, proxy, web, mobile, communications, catalog, etc.), MSCs, NSSs, HLRs, BSSs, UTRANs, VLRs, routers, switches, or advanced intelligent network devices. In one embodiment, the communications management system 202, network 204, and wireless network 206 may represent a cloud network system (or managing portions of a cloud network), mesh network, or server farm. The communications management system 202, network 204, or wireless network 206 may also include web servers or database servers. The servers may communicate data and perform other features associated with the disclosed embodiments. For example, the servers may save user profiles, previous directions, contacts, and other authorized user content.

In one embodiment, the communications management system 202 may generate a portal usable by devices of the communications environment 200. A portal may be a web site that functions as a central point of access to information on the Internet or an intranet. The portal may be accessed from any computing or communications system or device enabled to communicate through a network connection. The portal may be utilized to receive directional indicators or communicate the directional interfaces and indicators to one or more users or devices. In one embodiment, the portal is a web-based mobile application. The web-based mobile application may be useful in areas with extensive network coverage and users utilizing a number of different mobile platforms. The web-based mobile application may utilize the newest versions of languages, such as HTML (e.g. 5, 6, etc.), CSS, JavaScript, or other similar languages.

The computer 208 is any general-purpose, super computer, terminal, main frame, or application specific computer that may be utilized by an individual user, family company, business, or other organization. The computer 208 may execute an operating system, kernel, program, application, applet, servlet, source code, or other software instructions that implement the illustrative embodiments as is herein described. In one embodiment, the application displays the graphical user interface 209 for displaying or communicating information and receiving user input. For example, the graphical user interface 209 may display a location of a remote user utilizing a mapping application and a user interface for providing the remote user directional feedback. Likewise, any of the devices or systems of the communications environment 200 may display a graphical user interface. The computer 208 and other devices of the communications environment 200 may include any number of hard wired or wireless peripherals, input/output devices, and applications that are utilized to receive and communication information, data, directional feedback, and other information to the user. For example, the devices of the communications environment 200 may utilize a mouse, trackballs, touch screens, microphone (e.g. voice recognition), joystick, headset, keyboard, docking station, webcam, controller, image or video capture device, tactile input, or other input device or application.

The devices of the communications environment 200 may be specially configured for providing directional feedback and indicators or may be general purpose communications, computing, and navigation devices that are equipped with or include features for communicating directional feedback. The devices of the communications environment 200 may communicate directly or indirectly. For example, the directional interface 210 may communicate directly with the wireless device 212 and the wireless device 214 may communicate directly with the tablet 216. In another example, the computer 208 may communicate through one or more networks, such as the network 204 and the wireless network 206, with the laptop 218 or the GPS 220.

Figure 3:
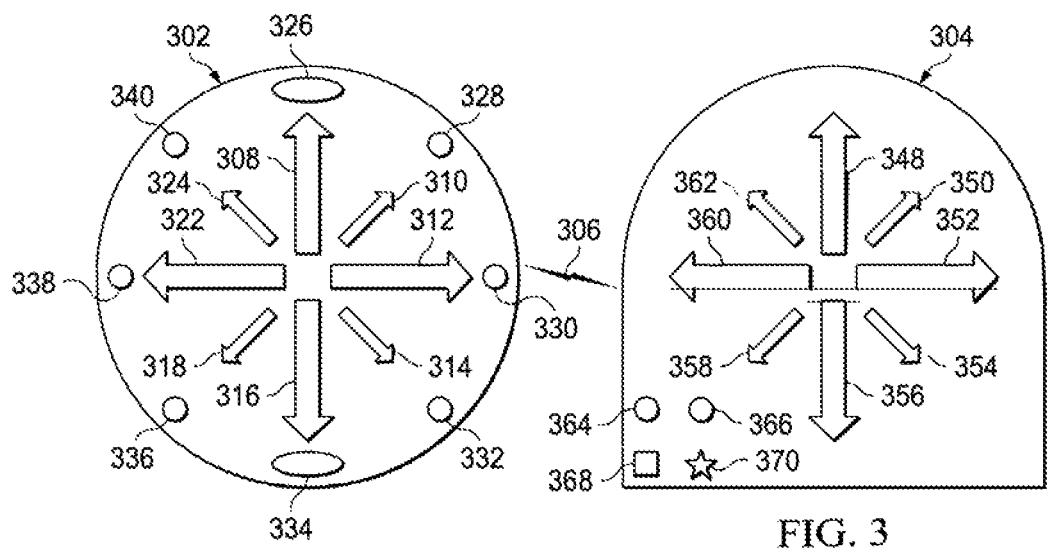
FIG. 3 is a pictorial representation of communications between directional interfaces in accordance with an illustrative embodiment.

FIG. 3 is a pictorial representation of communications between directional interfaces 302 and 304 in accordance with an illustrative embodiment. The directional interfaces 302 and 304 communicate directly through a wireless signal 306 as previously described. The directional interface 302 (utilized by a first user) includes directional indicators 308-324 and directional indicators 326-340. The directional interface 304 (utilized by a second user) includes directional indicators 348-362 and directional indicators 364-370. The directional interface 304 includes directional indicators 348-362 and indicators 364-370.

The size and shape of the directional interfaces 302 and 304 may vary based on the application. In one embodiment, the directional interfaces 302 and 304 may be stand-alone devices. In another embodiment, the directional interfaces 302 and 304 may be configured to be integrated with or attached to equipment, vehicles, games, weapons, systems, devices, clothes, accessories, or so forth. Alternatively, the directional interfaces may represent physical or graphical components that are integrated with or displayed by other devices, such as a computer, cell phone, GPS, vehicle, tablet, electronic glasses or goggles, watches, wearable accessories, televisions, monitors, electronic glass, heads-up-displays, or other devices.

The directional interfaces 302 and 304 may communicate with exact duplicates of themselves or with other compatible devices. In the shown example, directional interfaces 302 and 304 communicate through the wireless signal. In one embodiment, the directional indicators 308-324 are buttons, switches, designated portions of a touch screen, or other selection components configured to receive selections from a user utilizing the directional interface 302. The directional indicators 326-340 are configured to provide directional feedback received from another directional interface, such as the directional interface 304. For example, if the second user utilizing directional interface 304 selects directional indicator 350 (e.g. North East, forward and to the right, etc.), the signal is formatted/encoded and communicated as a wireless signal to the directional interface 302. The directional interface 302 is decoded to determine the feedback from the second user and the corresponding directional indicator 328 of the directional interface 302 is activated.

In one embodiment, the directional indicators 348-362 may be LEDs that are lit up in different colors corresponding to whether selected on the directional interface 304 or received as a signal from an external or remote directional interface, such as directional interface 302. For example, the directional indicators 352 may light up in red when selected by the second user utilizing the directional interface 304 and correspondingly the directional indicator 352 may light up in blue when the directional indicator 312 is selected by the first user and communicated to the directional interface 304 through the wireless signal. However, any number of colors or designations may be associated with any number of users. The directional indicators 348-362 may also represent soft buttons that perform the same functionality.

In another embodiment, the directional indicators 348-362 of directional interface 304 may be configured to both receive user selections from the second user and be activated in response to signals received from the directional interface 302. In one example, the directional indicators 348-362 light up in red when selected by the second user. The directional indicators 348-362 may light up in green when received from the directional interface 302.

The directional indicators 352 may also include programmed text, video or image labels associated with the users of the directional interfaces 302 and 304. In one embodiment, the directional indicators 364-370 may be configured prior to utilization or in real-time to receive additional user selections and indicate additional information to the second user. For example, the first user and second user may have decided previously pre-set meanings for the indicators 364-370. In one embodiment, the directional indicators and indicators of the directional interfaces 302 and 304 may include text that is displayed when activated to further clarify the information received. In another embodiment, the directional indicators of the directional interfaces 302 and 304 may be associated with specific sounds, audible output, vibrations, or so forth. For example, a number of vibrations from the directional interfaces 302 and 304 may indicate straight (1), right (2), back (3) or left (4). Similar, audio beeps or user programmed or defaults words may be associated with the directional indicators 348-370. In another example, the directional interfaces 302 and 304 may include braille labels or output.

In one embodiment, the directional interfaces 302 and 304 are touch screens that display the directional indicators 308-326 and 348-362, respectively, as well as the indicators 364-370. For example, the directional interfaces 302 and 304 may be programmed or customized by the first user and second user by connecting physically or wirelessly connecting the directional interfaces 302 and 304 to a user interface or application executed by additional computing or communications devices. For example, the users may establish the shape, size, and color of the directional indicators 308-326, 348-362 and indicators 364-370 when input by the user or received from another user and interface. For example, a drag and drop user interface may be utilized to customize the directional interfaces 302 and 304. In another embodiment, the directional interfaces 302 and 304 may be connected to a computing or communications device to perform the customization utilizing software executed by the device (i.e. customization program displaying a user interface).

The frequency may also be established for the directional interfaces 302 and 304 utilizing the user interface. The frequencies may be set utilizing hardware switches, buttons, or selection components or soft keys. In one embodiment, the default frequencies for one or more directional interfaces 302 and 304 may be assigned in a sequential order or randomly to prevent unwanted interception or eavesdropping of signals. In one embodiment, the directional interfaces 302 and 304 may be configured to utilize time shifting frequencies that are synchronized before utilization. For example, the directional interfaces 302 and 304 may include clocks and may switch between sets of frequencies or encryption codes (depending on the signal transmission type) associated with the directional indicators 308-326 and 348-362. Encryption, passwords, and data keys may also be utilized to secure communications between the directional interfaces 302 and 304. For example, the directional interfaces 302 and 304 may each require a password or pin before communications may be sent and received. The password may be received by selection of the directional indicators 308-324. Shifting frequencies may be particularly useful for military applications or other applications where secrecy is critical.

In one embodiment, the directional interfaces 302 and 304 may be utilized to select specific frequencies or security protocols and synchronize the information between directional interfaces 302 and 304. For example, the directional indicator 352 may be selected by the second user and the associated frequency may be associated with the directional indicators 312 and 330 in response to the first user simultaneously selecting one or more of the directional indicators 312 and 330. As a result, frequencies may be synchronized between directional interfaces 302 and 304 that have not previously communicated before. In addition, the frequencies may be changed and reset. For example, the directional interface 304 may also include a selection component for receiving a selection of frequencies for the directional indicators 348-362 and the indicators 364-370. Similarly, messages, packet codes, data, or packet information utilized for digital, packetized, or encoded signal communications may be synchronized between devices.

Figure 4:
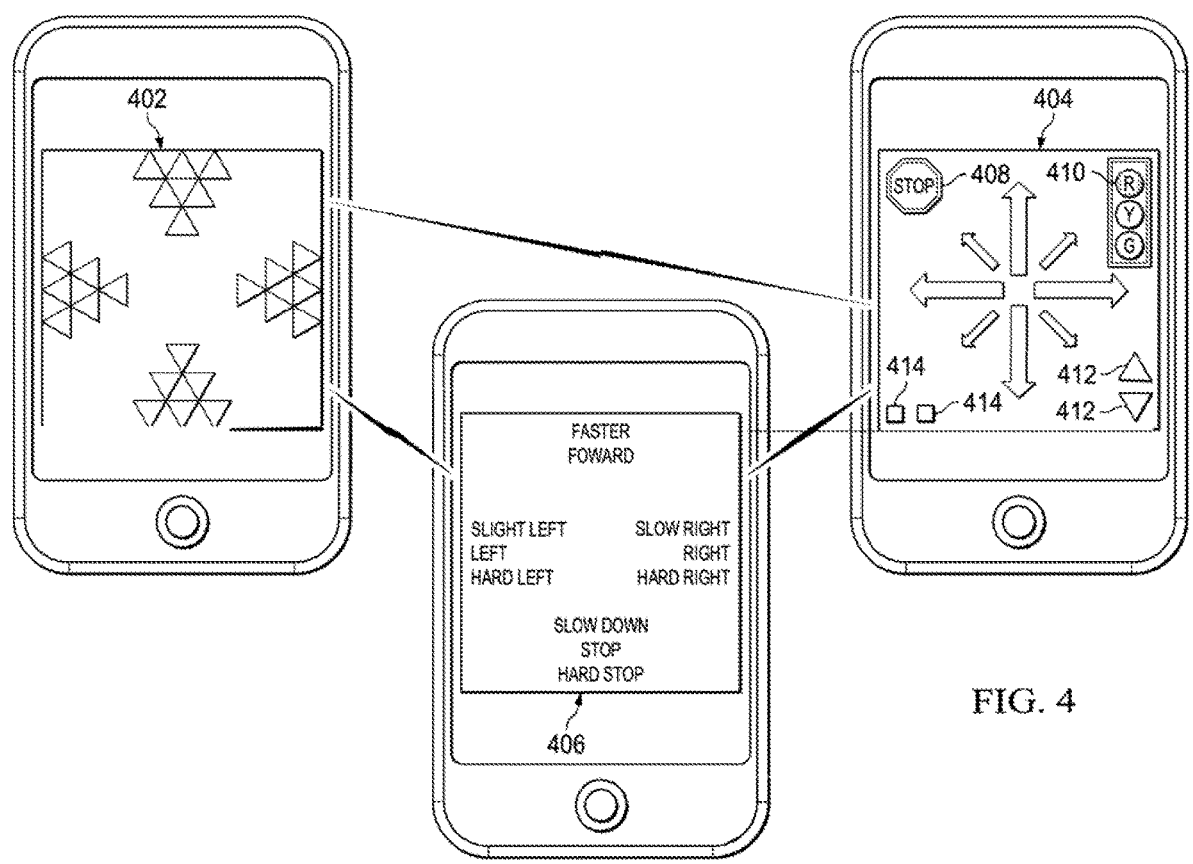
FIG. 4 is a pictorial representation of directional displays in accordance with illustrative embodiments.

FIG. 4 is a pictorial representation of directional displays 402, 404, and 406 in accordance with illustrative embodiments. The directional displays 402, 404, and 406 may represent graphical user interfaces, touch screens (i.e. tablet displays), dedicated directional interfaces, displays, or wireless devices. The directional displays 402, 404, and 406 illustrate different embodiments for providing and receiving directional feedback. The directional displays 402, 404, and 406 may include any number of textual, symbolic, or alphanumeric indicators for both receiving and communicating selections from a first user and receiving feedback from a second user. The directional displays 402, 404, and 406 may also display information or symbols in specific colors or shapes. For example, a user may select any of the indicators included in the directional display 402, 404, and 406 to be converted to a corresponding signal and transmitted to a secondary device or user.

The directional displays 402, 404, and 406 (i.e. integrated components) may provide a tactile sensation, such as vibration, or light up when selected by the user to provide feedback or when receiving feedback from another user. In another embodiment, the directional displays 402, 404, and 406 may give an audio indication of the indicator or selection provided by the user. For example, audio indications may indicate left, right, forward, back, faster, slower, up, down, diagonal, North, South, East, West, down, or any combination thereof. Terms such as "go" or "turn" may be utilized with the audio indications as well to further help the user. Text, audio or video messages may also be pinned to portions of a map for providing additional input as needed.

In one embodiment, the directional display 402 may utilize different levels of indicators to provide feedback. For example, the indicators may indicate a user is to go forward or speed up gradually or at an increased rate. Similarly, the indicators may indicate whether a turn to the left or right should be slight (or gradual) or direct (i.e. severe or hard). The indicators may similarly indicate slight, moderate, hard (e.g. turn, increase in speed, etc.). In one embodiment, the directional display 402 may be useful for providing a second user instructions for turning, controlling speed, hiking outdoors, or other navigation that requires more nuanced directions.

In one embodiment, the directional display 404 may display indicators corresponding to those of a compass (i.e. North, South, East, West, Northeast, Southeast, Northwest, and Southwest). The more finite indicators may allow a user to provide more specific and distinct feedback and two similarly receive information from one or more other parties. The directional display 404 may also have other indicators that have a meaning that is known in the art or understood between the communicating parties based on mutual agreement or displayed information. For example, the indicator 408 may indicate that the user is to stop when activated or lit up. The traffic light indicator 410 may indicate that the user is to stop, yield, or go. The indicators 412 may indicate whether the user is to slow down or speed up. The indicators 414 may have a meaning that is understood between die parties. In another example, die directional display 404 may display directional information, such as 4'oclock or 6'oclock representing incoming threats in two dimensions or three dimensions. In another embodiment, the indicators 414 may display textual information that may be similarly entered and received through the directional displays 402, 404, and 406. For example, as more and more displays utilize three dimensional displays and holographic images, the directional displays 402, 404, and 406 may utilize three dimensional systems, such as a globe of directional indicators. The directional displays 402, 404, and 406 may also be configured to be displayed according to the user's relative heading or based on a true North, South determination of the heading or location of the user.

In one embodiment, the directional display 406 may display only textual information. The directional display 406 may be programmed to display desired or custom information. The user may customize the directional display 406 (or corresponding application or device) to be most relevant and useful to the user. For example, the directional display 406 may display text in any language indicating information, such as faster, forward, slow right, right, hard right, slow down, stop, hard stop, slight left, left, and hard left.

The directional displays 402, 404, and 406 may also include buttons, indicators, or controls for power on/off, power save mode, orientation mode, one way/two-way communication, frequency selection, brightness, contrast, and color programming. In one embodiment, the directional displays 402, 404, and 406 may also display a compass, latitude and longitude, elevation, relevant maps, or so forth. In other embodiments, the directional indicators may be overlaid on a mapping application. In another embodiment, the directional displays 402, 404, and 406 may be displayed in a bottom portion or relative small segment of a window, touch screen, projection, or so forth to receiving selections and display selections from other users.

Figure 5:
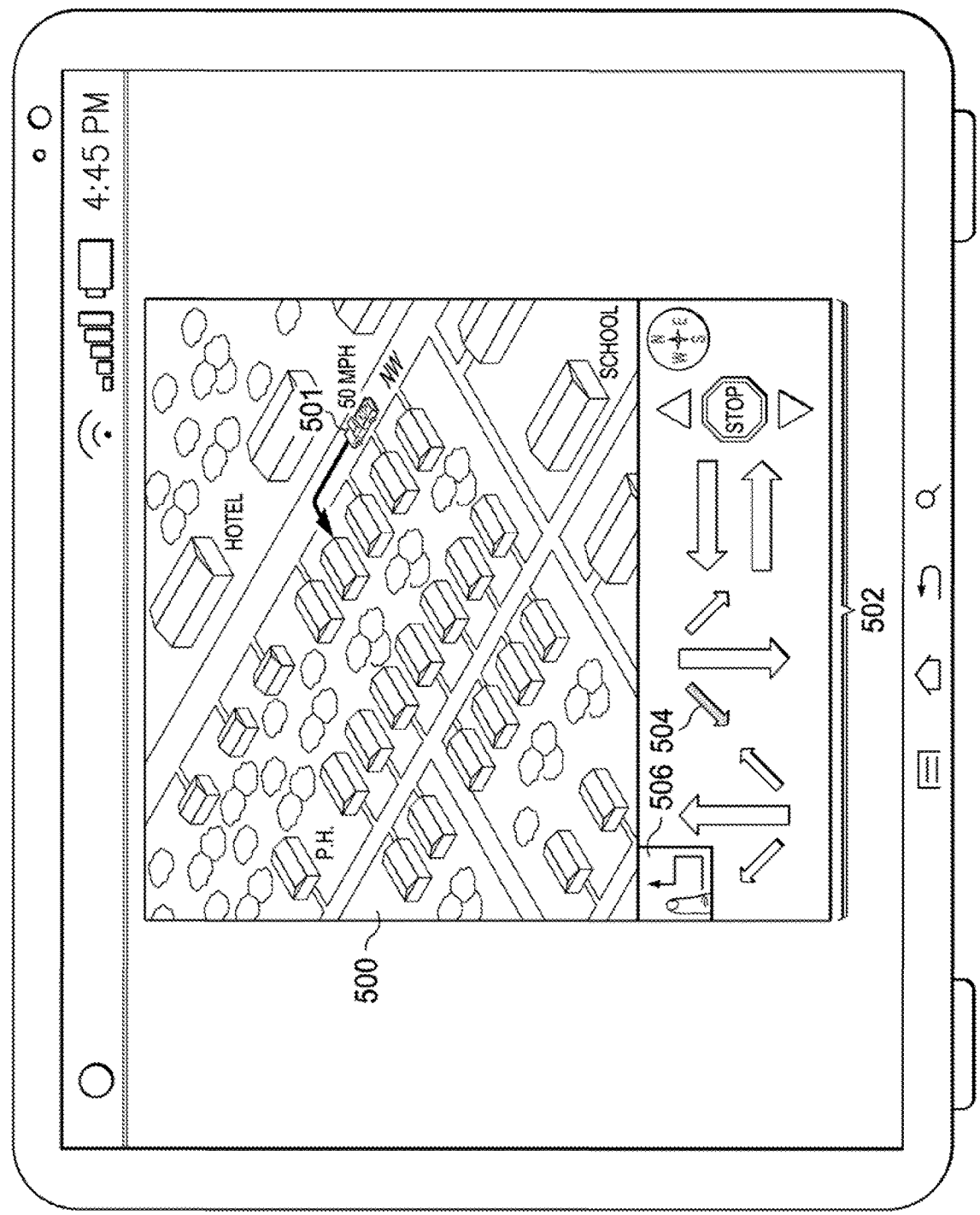
FIG. 5 is a pictorial representation of a mapping device in accordance with an illustrative embodiment.

FIG. 5 is a pictorial representation of a mapping interface 500 in accordance with an illustrative embodiment. The mapping interface 500 may be displayed by a GPS device, wireless device, or other computing or communications device as previously described. When a number of users are communicating by exchanging directional feedback and indicators, a map of the other user's (or multiple users) location or position may be displayed to the other user's display, interface, or device. For example, the mapping interface 500 may be displayed to a second user as if she were in the "shoes" or "vehicle" of a first user. The map may also indicate the location (e.g. 2-D space, 3D space, address, latitude, longitude, altitude, position within a structure, etc.), direction, and speed. In one embodiment, die mapping interface 500 may estimate or calculate the speed of the first user 501 based on location measurements for display on the mapping interface 500. Other methods of speed and direction determinations may also be utilized. For example, GPS information and coordinates may be inserted, mapped, or overlaid onto the mapping interface 500. The mapping interface 500 may be utilized by a sending party or a receiving party.

In one embodiment, the mapping interface 500 may display indicators 502 for providing directional feedback at a bottom portion of the mapping interface 500. The indicators 502 may represent default indicators available to the mapping interface 500. Customer indicators may also be added. In one embodiment, when customer indicators are added to a first interface or device, the custom indicators may be synchronized or communicated to a second interface or device for consistency.

The users may also draw on the mapping interface 500 utilizing a free form direction tool 506. For example, the mapping interface 500 may represent a touch screen GPS, phone, computer, tablet, electronic glass, or similar device. The free form direction tool 506 may allow the second user to draw a customized path, route, or information on the mapping interface 500 that may be communicated in real-time or near real-time to the first user 501. For example, the free form path may be communicated in real-time as it is drawn on the mapping interface 500. The drawing may be performed utilizing a finger, stylus, motion capture system, eye motion, joystick, buttons, or forms of drawing. The free form direction tool 506 may provide a quick way to provide custom instructions between users without using as much bandwidth or ongoing communications.

The mapping interface 500 may be configured to clean up the path slightly (e.g. performing smoothing, removing doubling back indications, or side-to-side variations, etc.) so that the intent of the user is maintained while still providing a clean drawing. The path may include arrows or other indicators for clarity. The second user may also be presented with the option to wrap the free form drawing on the mapping interface 500 to the nearest roads, trails, paths, flight paths, lanes, or mapping designations. The free form path may be wrapped to the mapping interface 500 to provide additional clarity and to facilitate the users in obeying applicable laws, keeping societal norms for walking or traveling by vehicle, and not taking the free form instructions too literally. The indicators 502 may also be utilized to perform free form drawings from a beginning point to an end point. The free form path may be linked or associated with relevant mapping data indicating distances of the entire path or segments of the path, locations of turns or course changes (e.g. latitude and longitude, physical address, GPS coordinates, etc.), and so forth.

In one embodiment, the free form path may be broken down into path segments with the exact location and direction of each node being determined for duplication. The distance between nodes may be set automatically based on the changes in the free form path, overall distance, or user feedback. For example, a free form path that makes lots of different path changes may require a higher number of nodes or path segments than a longer path with relatively few changes. In one embodiment, the free form path may only be broken up by significant turns or changes in the path to reduce complexity and conserve memory. For example, free form paths may be particularly useful for a company that wants to provide a customized driving tour of a city. A virtual tour guide may draw out the path for the first user 501 based a number of sites or locations that the user has requested to see or visit. The free form path may then be displayed to the mapping interface 500 for the first user 501 to follow. If another user ever wants the exact same path, the user may retrieve die saved free form path and then customize it for another user.

Directions provided utilizing the indicators 502 may also be saved for display or playback at predefined time intervals or according to the user's location. For example, if an indicator 504 was displayed to die first user 501 at an exact location, the communications session and directional indicators may be saved so that the indicator 504 (as well as any number of other indicators) may be played back to another user based on the location the previous instructions were provided. Duplicating directional feedback may be repeated for a series of directions provided. Repeating directional feedback may be useful for individuals coming from similar directions or in similar positions that need customized instructions or feedback.

All or portions of the free form path may be customized as are described herein by redrawing, erasing, modifying (e.g. dragging, straightening, or so forth. For example, the nodes may be grabbed and dragged on the mapping interface to change the free form path as communicated alone or with an electronic map or portions of a map. The free form path or other directional feedback may also be configured to receive visual, audio, or video components, such as icons, graphics (e.g. dirt roads, bike paths, buildings, trees, forests, etc.), user inserted text, or audio instructions. User instructions may pop up or be displayed, played, or communicated to a user as the user nears a location associated with the user instructions. For example, the audio message recorded by one user indicating "there is a dirt road just behind this large house that you need to turn on" may be played to a second user as part of the directional feedback. The user instructions may be recorded or generated in real-time.

The various applications may include functionality for text messaging in the application, chatting, emailing, communicating short audio messages, or so forth. In one embodiment, each time there is a significant course change in the free form path or directions, an audio, visual, or tactile alert may be communicated to the user through the device. For example, a wireless device may vibrate, flash an arrow that takes up the entire screen that has an arrow pointing to the right, and provide audio instructions to turn right before the user reaches a turn.

In another embodiment, one or more of the indicators 502 may be selected at once to create a free form path. In one embodiment, any free form text may be linked, scaled, or associated with the mapping interface 500 (e.g. zoom level, map configuration including relative direction and orientation, legend, etc.) so that if the user zooms in or out, the free form text remains true (e.g. scale, orientation, etc.) to the original input. Input received through the free form direction tool 506 may also be saved locally or to a network. The free form directions may then be accessed at a later time by the same user or a different user that receives the free form directions as a message. In another embodiment, the free form directions may be converted for users that are in nearly the same position. In other words, the current location of a user may be connected to the free form path so that the entire path does not have to be generated again.

In one embodiment, the free form path may be drawn for an area without a network connection. As a result, the free form path may be shared utilizing direct communications (e.g. near field communications, Bluetooth, Wi-Fi, docking to a central or single device, etc.). The free form paths may also be shared by email, chat, or text message for users that may travel to a particular location. For example, free form directions to a favorite fishing spot without network coverage (but with mapping information) may occur in an area with network coverage between friends before network coverage becomes unavailable. In one embodiment, automated mapping systems may be utilized to guide a user to the point where the free form path begins. Free form paths may be useful for areas without road or other information. Free form paths may also be shared and aggregated utilizing social networks and mapping systems to update information available to systems, such as the mapping interface 500.

In one embodiment, the mapping interface 500 may be displayed to a GPS device of a first user 501 that is traveling from one location to another. The mapping interface 500 may display the exact or approximate location of the first user 501 and may be updated periodically or in real-time. The location of the first user 501 may be displayed to both the mapping interface 500 and a secondary interface utilized by a second user to provide directional feedback.

As frequently happens, the first user 501 may become lost or need additional instructions. The user may send a message, call, text, email, or communication or request to communicate with the second user utilizing a communications device, application, or components integrated with the mapping interface 500 or separate from the mapping interface 500. The user may then connect with the user utilizing contacts, an invitation acceptance in an application, or other open or dedicated communications session.

In one example or mode, the first user 501 and the second user may be talking to each other through the phone. The second user may provide directional feedback to the first user during the phone call. This may be useful if one or both of the first user and the second user is utilizing an integrated or external speaker system, headphones, or so forth. The first user 501 may also be temporarily utilizing the mapping interface 500 (i.e. a cell phone) as a mapping device (i.e. a GPS device) utilizing a mount in a vehicle. The mapping interface 500 may be helpful to users that better understand directions visually in a format more similar to many global positioning systems and mapping systems.

In one embodiment, the communications between directional interfaces may compensate for data latency or other delays (e.g. map updates, processing, etc.). As a result, the mapping interface 500 may display die anticipated or extrapolated position of the first user 501 at the time the second user receives or is displayed the information. In one embodiment, the latency may be determined by the data paths, processing devices, or round trip messages. For example, the latency may be 1.5 seconds, and as a result, the mapping interface 500 may display the anticipated location of the first user 501 1.5 seconds in the future for communication to the user. In other embodiments, the anticipated latency may be adjusted by the users to give additional time to provide feedback and instructions. Extrapolation may be performed utilizing the direction, speed (e.g. current, historical, etc.), incline, traffic conditions, speed limits, and other known information, parameters, conditions, and circumstances. As a result, the second user may be able to provide instructions or feedback that reaches die user before it is too late to take an action, such as turning, slowing down, changing directions, or so forth.

In another example or mode, the first user 501 may represent a potential house buyer and the second user may represent a real estate agent that is providing the first user instructions in real-time for the best way to reach a house the second user is going to be looking at. Communications between the first user and the second user may be generated through a request for instructions generated by the first user 501 and sent to the second user utilizing a mobile application or web-interface and accepted by the second user in the mobile application or web-interface. This mode may be useful for individuals that are uncomfortable talking to each other on the phone, but are fine with providing directions utilizing the display indicators 502 or free form direction tool 506.

In another example, or mode, the first user 501 may represent an individual driving through a city or other location. The first user 501 may send an invitation to the user to follow the user's path. Once the invitation is accepted, the first user's path as of that moment is then displayed on the mapping interface 500 to the second user to follow the user. In another embodiment, the user's entire path (prior to the request) may also be displayed to the mapping interface 500. This mode may be useful when a number of user's are following a single user that knows the way or a best path. The user may also utilize the mapping interface to send the recorded path. The recorded path may then be sent at a subsequent time to another user or utilized by the same user to retrace a path at a later time.

As a result, the second user may send instructions through an application or device in the form of a directional indicator to the mapping interface 500. For example, one of the indicators 502, such as indicator 504, may be activated or lit up indicating that the first user 501 should turn to the Southwest (or back into the left) when the first user has the opportunity. As previously described, the other indicators 502 may allow the first user 501 to receive directional feedback including indications that the first user 501 should speed up, slow down, or stop altogether. Feedback regarding speed may be particularly useful when the first user and second user are in close proximity.

The second user may provide feedback to the first user utilizing a computing device executing a directional feedback app or program. For example, the second user may select the indicator 504 utilizing a mouse, voice command, touch selection, or other selection. The second user may notice that the first user 501 is lost or unsure of which direction to take. The indicator 504 may also light up, change colors, or give a verbal confirmation in response to selection of the indicator 504 to provide positive feedback.

The information relating to the second user or one or more multiple users may similarly displayed on the mapping interface 500 for sending and receiving directional indicators. For example, the indicators 502 may be utilized by multiple parties to converge on a single park in a city to socialize. For example, the guiding user may select an icon or selection component corresponding to a selected user to provide instructions that are communicated to only that user before selection a different icon to provide individualized instructions to a second user. The commercial, social, and military applications may provide for more efficient instruction giving alone or in combination with verbal instructions. As a result, a user may associate directional feedback with one or more users during a broader communications session with multiple users to provide clarity and adaptability to rapidly changing circumstances.

The described embodiments, modes, and processes may be utilized in any number of personal, commercial, organization, military, social, or other contexts that may benefit different users. The users may switch between modes and communications methods based on convenience. If network or wireless access becomes intermittent, the directional indicators or paths may be sent through text or other forms of messages.

Figure 6:
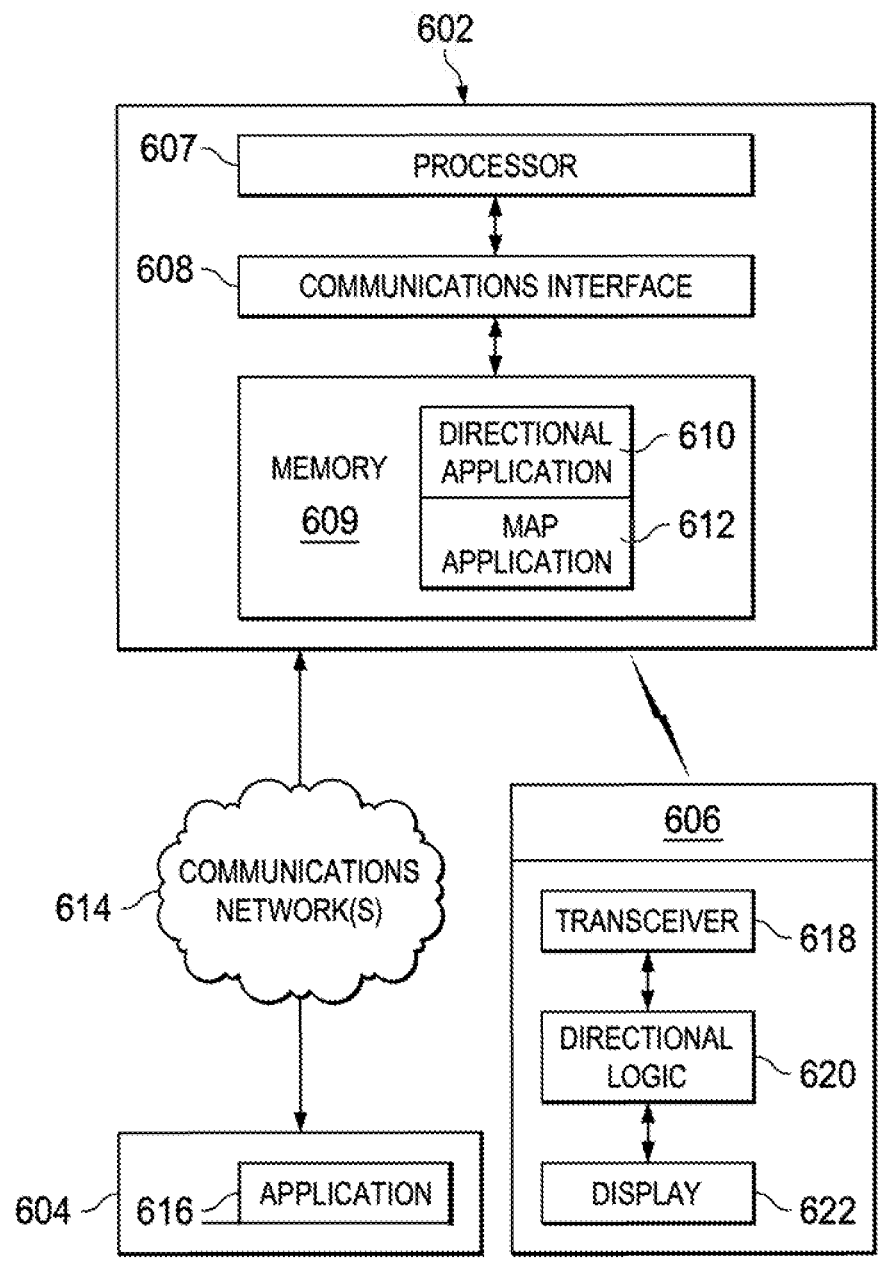
FIG. 6 is a block diagram of devices utilizing directional interfaces in accordance with illustrative embodiments.

FIG. 6 is a block diagram of devices 602, 604, and 606 utilizing directional interfaces in accordance with illustrative embodiments. In one embodiment, the device 602 may include a processor 607, a communications interface 608, a memory 609, a directional application 610, and a map application 612. The devices 602 and 604 may communicate through the communications network 614. The device 604 may utilize an application 616. The device 606 may include a transceiver 618, directional logic 620, and a display 622.

The directional application 610, the map application 612, and application 616 may represent modules or logic. As referenced herein, a module refers to a grouping of code, hardware, or some combination thereof, that are operable to perform particular tasks associated with the disclosed embodiments. For instance, each of the disclosed modules includes computer executable instructions that when loaded into a memory and executed by a processor performs one or more functions associated with the disclosed embodiments. The logic may include digital or programmable logic configured to perform the processes and functionality as herein described.

The devices 602, 604, and 606 may represent any number of cell phones, PDAs, tablets, electronically convertible devices, radios, mp3 players, GPS devices, windshields, electronic glass, glasses, e-readers, wearable clothing or accessories, helmets, goggles, heads-up-displays, computers, personal computers, or other electronic devices.

The devices 602, 604, and 606 may include any number of computing and telecommunications components, devices or elements that are not specifically described or called out that may include busses, motherboards, circuits, ports, displays, microphones, speakers, interfaces, cards, converters, adapters, connections, transceivers, displays, antennas, and other similar components.

The processor 607 is circuitry or logic enabled to control execution of a set of instructions. The processor 607 may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor 607 may be a single chip or integrated with other computing or communications elements.

The memory 609 is a hardware element, device, or recording media configured to store data for subsequent retrieval or access at a later time. The memory 609 may be static or dynamic memory. The memory 609 may include a hard disk, random access memory, cache, removable media drive, mass storage, or configuration suitable as storage for data, instructions, and information. In one embodiment, the memory 609 and processor 607 may be integrated. The memory may use any type of volatile or non-volatile storage techniques and mediums. The memory 609 may store free form paths, sequence of directional indicators, or other provided instructions, feedback, or commands.

The communications interface 608 is the components for receiving user input and sending and receiving signals. The communications interface 608 may include a transceiver. The transceiver is the circuitry configured to send and receive signals. As described, die signals may be analog or digital. In addition, the signals may be communicated directly or through the communications network 614. The communications interface 608 may also include a user interface for receiving user input including directional indicators. The communications interface 608 may also include a display for displaying information to a user. For example, the devices 602, 604, and 606 may include any number of soft keys or hard keys.

Hard keys are dedicated buttons or interface elements hard-coded for a single, unique, and consistent purpose. Examples of hard keys include the directional indicators of the described embodiments. Hard keys may also include a dedicated keyboard, track ball, arrows, mouse, and other buttons.

Soft keys are programmable buttons or interface elements. Soft keys may be positioned or located anywhere on a display device, such as a touch screen. Each of the soft keys may perform different functions in response to the default or user-defined programming. In one embodiment, soft keys may display symbols, text, or other that identify the soft key. For example, the soft keys may be directional indicators.

The directional application 610 is an application, program, or set of instructions configured to generate, format, convert, and display directional indicators as herein described. The directional application 610 may be a locally installed application or web-based mobile application that is utilized through the communications network 614.

The device. 602 may also include a map application 612. The map application 612 is configured to format location and map information for display by the communications interface 608. The map application 612 may be a geographic information system. The map application 612 may also display location and map information associated with the devices 604 and 606 or other devices. The map application 612 is an application user interface. For example, the map application 612 may represent programs, interfaces, or systems, such as Google Maps, Apple Maps, Bing Maps, Navteq/Nokia, Google Earth, Yahoo maps, Mapquest, Trimble, OpenLayers, Garmin, Microsoft Streets and Trips, Leaflet, Modest Maps, Polymaps, MapBox, CloudMade, Geoloqi, WeoGeo, and other similar mapping, electronic atlas, cartography, and related programs. The map application 612 may also represent an application that utilizes public, open-source, or proprietary databases compiled and maintained by OpenStreetMap, Navteq, Google, ArcGIS, Cadcorp GeognoSIS, ESRI, ArcIMS Server, Google Earth, Google FusionTables, MapServer, Mapnik, and other similar providers, applications, and organizations. In one embodiment, the map application 612 is an application built on any of the previously described APIs, such as Google Maps, Mapquest, or Apple Maps.

In one embodiment, the directional application 610 and the map application 612 may be integrated. The directional application 610 and map application 612 may also be integrated in an operating system, kernel, or other instructions executed by the processor 607. The directional application 610 may be configured to communicate with the map application 612 and the communications interface 608 for sending and receiving directional indicators.

In one embodiment, the device 606 is a stand-alone device for sending and receiving directional indicators. The transceiver 618 sends and receives information to one or more other devices, such as the device 602. The transceiver 618 may be designated to utilize any number of default or user specified frequencies. For example, the transceiver 618 may associate ten distinct directional indicators with ten distinct frequencies within a band. In one embodiment, the transceiver 618 may utilize frequency modulation or amplitude modulation.

The directional logic 620 may be hardware or software configured to format incoming and outgoing signals for display and communication, respectively. The directional logic 620 may be programmable and may include a processing unit and memory. For example, the directional logic 620 may be a field programmable gate array that allows the user to program the directional indicators communicated and displayed. The directional logic 620 may convert the received signals into directional indicators communicated to the display 622. The directional logic 620 may also convert user selections of directional indicators into a signal that is formatted for communication. For example, each directional indicator received through the display or user interface components may be associated with a specified frequency that is communicated by the transceiver 68. In another example, the selected directional indicator may be encapsulated into packets including the associated information.

In one embodiment, the directional logic 620 may include one or more amplifiers to amplifying the wireless signals associated with the directional indicators to a designated or legal threshold. The directional logic 620 may also include a user indicator, such as a switch, for selecting output wattage.

The directional logic 620 may also include filters and circuits for reducing background noise. For example, the directional logic 620 or transceiver 618 may utilize a circuit to perform sub-audible tone squelch, such as continuous tone-coded squelch system (CTCSS) and digital-coded squelch (DCS), digital tone code squelch (DTCS), and XTCSS. The CTCSS and DCS encoders and decoders as are known in the art may be activated or deactivated by a user based on a user selection. The transceiver 618 may be configured to transmit and receive utilizing CTCSS encoding and decoding. The transceiver may broadcast tones and sub-audible tones that are utilized to communicate a directional indicator.

The display 622 is an output device for presentation of information in visual or tactile form. The display 622 may be an LED, OLED, touchscreen, segment display, or other digital or analog display.

In one embodiment, the devices 602, 604, and 606 may be integrated in additional components, devices, equipment, or systems of vehicles, household devices, appliances, computing devices, or other communications devices.

Figure 7:
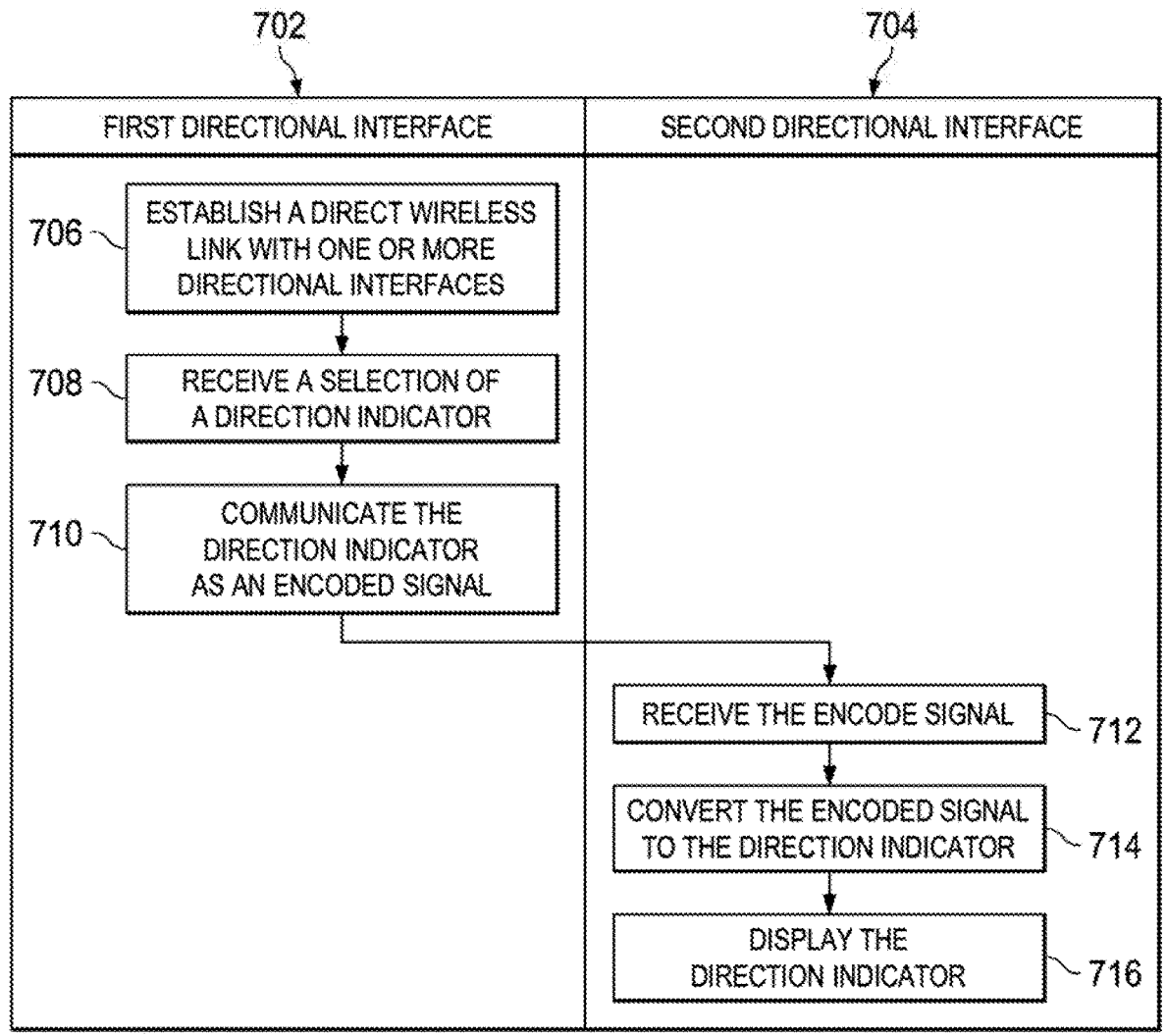
FIG. 7 is a flowchart of a process for providing directional feedback in accordance with an illustrative embodiment.

FIG. 7 is a flowchart of a process for providing directional feedback in accordance with an illustrative embodiment. The process of FIG. 7 may be implemented by a first directional interface 702 and a second directional interface 704. In addition, the first directional interface 702 may communicate simultaneously, concurrently, or selectively with multiple directional interfaces. For example, the first directional interface 702 may include a button or switch for alternating between directional interfaces. For example, a set of frequencies may be changed, an address, user, or identification of the receiving device may be selected for communication, or one of the directional interfaces is otherwise selected.

The process of FIG. 7 may begin with the first directional interface 702 establishing a direct wireless link with one or more directional interfaces (step 706). For example, the wireless link is an established communications session between the first directional interface 702 and the second directional interface 704. In one embodiment, the direct wireless link may be intermittent based on the terrain, conditions, or environment of the first directional interface 702 and the second directional interface 704.

Next, the first directional interface 702 receives a selection of a directional indicator (step 708). The selection may be received through a directional indicator that is a hard or dedicated button or a soft button. As described, the directional indicator may also be received through voice recognition, eye motion, image capture, joystick, tactile feedback, or other user input. The directional indicator may also represent free form text, audio instructions, text instructions, or video instructions that are generated by the user as herein described.

Next, the first directional interface 702 communicates the directional indicator as an encoded signal (step 710). In one embodiment, the directional indicator is communicated at a specified frequency for reception by the second directional interface 704. In another embodiment, the directional indicator is packetized with the information associated with the directional indicator (i.e. left, right, forward, back, slower, faster, stop). The directional indicator may be placed in the payload, header, or even trailer. Error detection, such as a checksum cyclic redundancy check, or parity checks may also be utilized. In another embodiment, point-to-point communications of bytes, characters, or bits associated with each directional indicator or other information may also be utilized. Broadcast, multipoint, or point-to-multipoint communications may also be utilized.

Next, the second directional interface 704 receives the encoded signal (step 712). In one embodiment, the second directional interface 704 may always be configured to receive the directional indicator. In another embodiment, the directional interface 704 may poll for the encoded signal.

Next, the second directional interface converts the encoded signal to the directional indicator (step 714). For example, the information or data specifying the directional indicator may be retrieved from a received packet. The second directional interface 704 may format the directional indicator for the display and corresponding hardware and software.

Next, the second directional interface 704 displays the directional indicator (step 716). The directional indicator may be displayed in the format that is compatible with the second directional interface 704.

Figure 8:
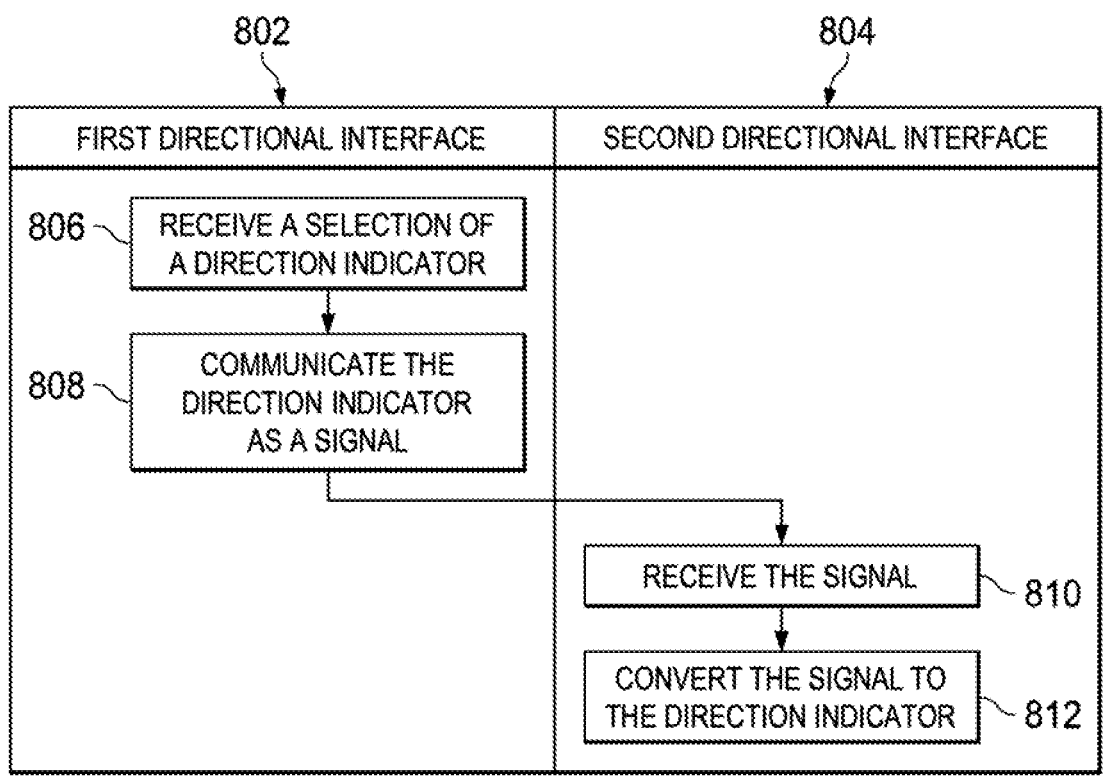
FIG. 8 is a flowchart of a process for communicating utilizing directional interfaces in accordance with an illustrative embodiment.

FIG. 8 is a flowchart of a process for communicating utilizing directional interfaces in accordance with an illustrative embodiment. The process of FIG. 8 may begin with the first directional interface 702 receiving a selection of direction indicator (step 806). Any of the described devices, interfaces, applications, or systems may be configured to present the first and second directional interfaces 802 and 804.

Next, the first directional interface 702 communicates the direction indicator as a signal (step 808). In one embodiment, the signal is only transmitted during the time the directional indicator is selected by the user. For example, the direction indicator may activate a transceiver to transmit an analog signal associated with the selected directional indicator. The first directional interface 802 and second directional interface 804 may have a specified frequency for each of the directional indicators which may include numerous indicators. In another example, the directional indicator may be activated with a first packet and may end with another packet deactivating the directional indicator.

Next, the second directional interface 804 receives the signal (step 810). The second directional interface converts the signal to die direction indicator (step 812). For example, the transceiver may receive the signal and the frequency may specify the direction indicator.

Figure 9:
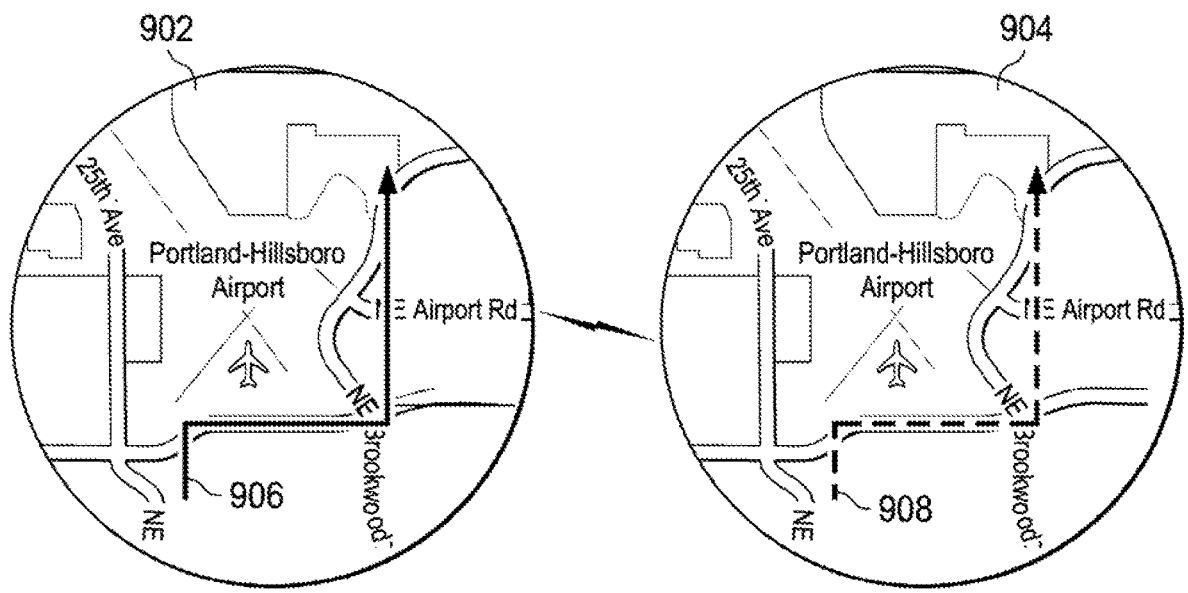
FIGS. 9 and 10 are pictorial representations of directional interfaces in accordance with illustrative embodiments.
Figure 10:
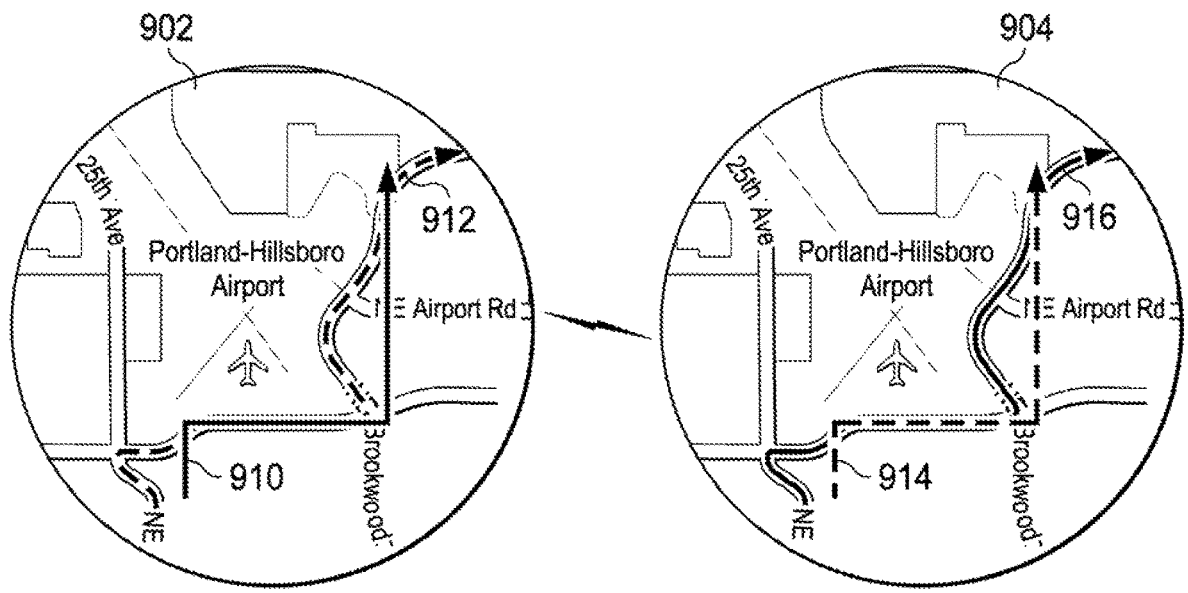

FIGS. 9 and 10 illustrate directional interfaces 902 and 904 in accordance with illustrative embodiments. With regard to FIG. 9, the directional interfaces 902 and 904 may represent stand-alone devices or dual-purposes devices, such as wrist watches, jewelry, wireless devices, goggles, or so forth.

In one embodiment, the directional interfaces 902 and 904 may have touch screens that are activated based on user interaction. For example, a first user may use a finger or stylus to trace out direction 906 on the directional interface 902 that is transmitted to the directional interface 904. The direction 908 may then be displayed by the directional interface 904. The directions 906 and 908 may be displayed differently to indicate whether the first user utilizing directional interface 902 or the second user utilizing the directional interface 904 entered the directions. For example, input received as the direction 906 entered by the first user may be displayed as a solid line on the directional interface 902 and a dotted line on the directional interface 904. In another embodiment, different line colors, line widths, or other information may be utilized to represent whether the directions 906 or 908 are being sent or received.

In one embodiment, the exact input of the direction 906 received on the directional interface 902 is converted into measurements or coordinates for communication to the directional interface 904. For example, the direction 906 may be a series of points or nodes (i.e. x, y coordinates laid out on axis of a grid) that when connected make up the direction 906.

In one embodiment, the directional interfaces 902 and 904 may represent devices with batteries, logic, displays, microphone, speaker, and transceivers that may be customized to display directional indicators and receive information. For example, the logic may include hardware, firmware, and software that may be customized to update the directional interfaces 902 and 904, such as an FPGA. The transceiver may communicate utilizing a number of wireless standards. The directional interfaces 902 and 904 may be customized alone, by connecting to a network or portal through a wireless connection (e.g. Wi-Fi, Bluetooth, NFC, 4G), or by electronic physical connection to a computing device with a user interface for configuring the operation and display of each of the directional interfaces 902 and 904. The configuration software may allow different directional indicators to be customized and utilized as are herein described. In one embodiment, the directional interfaces 902 and 904 may be utilized as a learning tool for programming or modifying communicating electronic devices.

With reference to FIG. 10, the directional interfaces 902 and 904 illustrate directions 910-916. The solid lines of the directions 910 and 916 represent free form paths, selections, instructions, or feedback received through the directional interface 902 (utilized by the first user) and the directional interface 904 (utilized by the second user), respectively. The dotted lines of the directions 912 and 916 represent wireless signals received from the other directional interface (e.g. the directions 912 were transmitted from the directional interface 904 to the directional interface 902 for displays as the directions 916).

In another embodiment, the directions 916 may represent a free form path before processing and then the free form path once it was wrapped, snapped, smoothed, or processed to available roads, paths, or areas. For example, the first user may be driving and select to properly align the directions 912 with the available roadways. An alignment of the directions 912 may be represented by directions 910.

Figure 11:
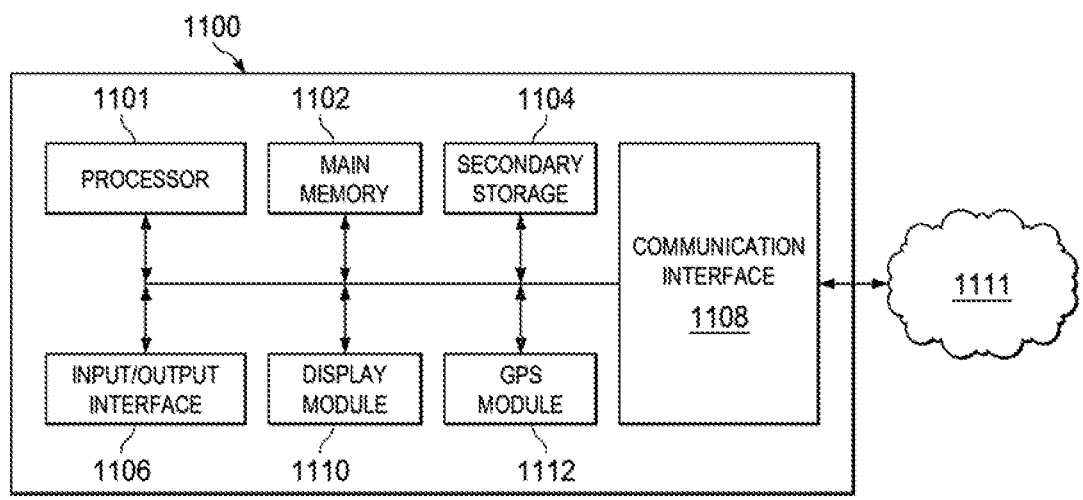
FIG. 11 illustrates a pictorial representation of various components of the user device in accordance with one embodiment.

FIG. 11 illustrates a pictorial representation of various components of the user device 1100 in accordance with one embodiment. The user device 1100 is another embodiment of a communications device or directional interface. In one embodiment, the user device 1100 includes a processor 1101, main memory 1102, secondary storage unit 1104, an input/output interface module 1106, a communication interface module 1108, a display module 1110, and a global positioning system (GPS) module 1112. The processor 1101 may be any type of processor capable of executing instructions for performing functions associated with the user device 1100 and the features associated with the claimed embodiments.

Main memory 1102 is volatile memory that stores currently executing instructions/data, or instructions/data that are prefetched for execution. The secondary storage unit 1104 is non-volatile memory for storing persistent data. The secondary storage unit 1104 may be or include any type of data storage component such as a hard drive, a flash drive, or a memory card. In one embodiment, both the main memory 1102 and secondary storage unit 1104 may be non-volatile memory, such as MRAM or flash memory.

The input/output interface module 1106 enables the user device 1100 to receive user input and output information to a user or other devices. For example, the input/output interface module 1106 may include a keyboard interface for receiving keyboard inputs from a user. The input/output interface module 1106 may also include a mouse/trackball interface for enabling a user to position a pointer on a user interface for selecting or entering data. In some embodiments, the input/output interface module 1106 also provides audio and video capabilities. For instance, the input/output interface module 1106 may interface with an internal or external camera for providing videoconferencing or image capturing. The input/output interface module 1106 may also enable external devices such as printers, USB flash drive, speakers, to be connected to the user device 1100. The input/output interface module 1106 may also be a touchscreen that displays a keyboard and other user interfaces for receiving user selections and displaying applicable information.

The communication interface module 1108 enables the user device 1100 to communicate with the network 1111. For example, the network interface module 1108 may include a network interface card for hardwiring the user device 1100 to the network 1111. In one embodiment, the communication interface module 1108 includes a wireless data interface for enabling the user device 1100 to communicate wirelessly through a wireless access point or a wireless communication tower with die network 1111. In addition, the communication interface module 1108 may also include a radio frequency transceiver for sending and receiving cellular signals for voice communications.

The display module 1110 enables information to be displayed on an internal or external display device. In some embodiments, the display module 1110 may include instructions or hardware for providing touchscreen capabilities for receiving user input via the display device. In certain embodiments, the display module 1110 may also enable multi-touch functionalities associated with the display device.

In one embodiment, the GPS module 1112 provides location information of the user device 1100. In particular, the GPS module 1112 receives signals transmitted by global positioning system satellites. Based on the received time differences between the signals from different global positioning system satellites, the GPS module 1112 is able to determine a 2D position (latitude and longitude) of the user device 1100. In one embodiment, with four or more satellites signals in view, the GPS module 1112 can determine the user device 1100's 3D position (latitude, longitude and altitude). In some embodiments, once the user device 1100's position has been determined, the GPS module 1112 can calculate other information, such as speed, bearing, trip distance, etc. The GPS module 1112 The GPS module 1112 may also include maps that may be stored locally or accessed to determine the user's location within a building or structure. For example, the user's location, heading, and walking speed on the second floor may be determined. The GPS module 1112 may display outdoor or indoor information, such as trees, streams, valleys, mountains, ravines, stairs, escalators, lobbies, rooms, walls, layout plans, In an alternative embodiment, if the user device 1100 does not include a GPS module 1112, the location of the user device 1100 may be determined by other means. For example, if the user is using a laptop to communicate either wired or wirelessly with the network 1111, an IP address of wireless base station and/or router may be used to identify a location of the user device 1100. As another example, if the user device 1100 is a cellular phone without a GPS module 1112, the location of the user device 1100 may be determined by cellular or wireless signal triangulation by tracking the strength of signals received from nearby cell phone towers, routers, beacons, or radiation sources (e.g. overhead lights, signs, etc.). Still, in some embodiments, the location of the user device 1100 may be manually entered or given via a voice command by a user of the user device 1100.

The disclosed embodiments are not intended to be limited by only the above means for determining the location of the user device 1100, but cover any other means, including, but not limited to, Near Field Communication/Radio-Frequency Identification (NFC/RFID), for identifying a location of the user device 1100.

Figure 12:
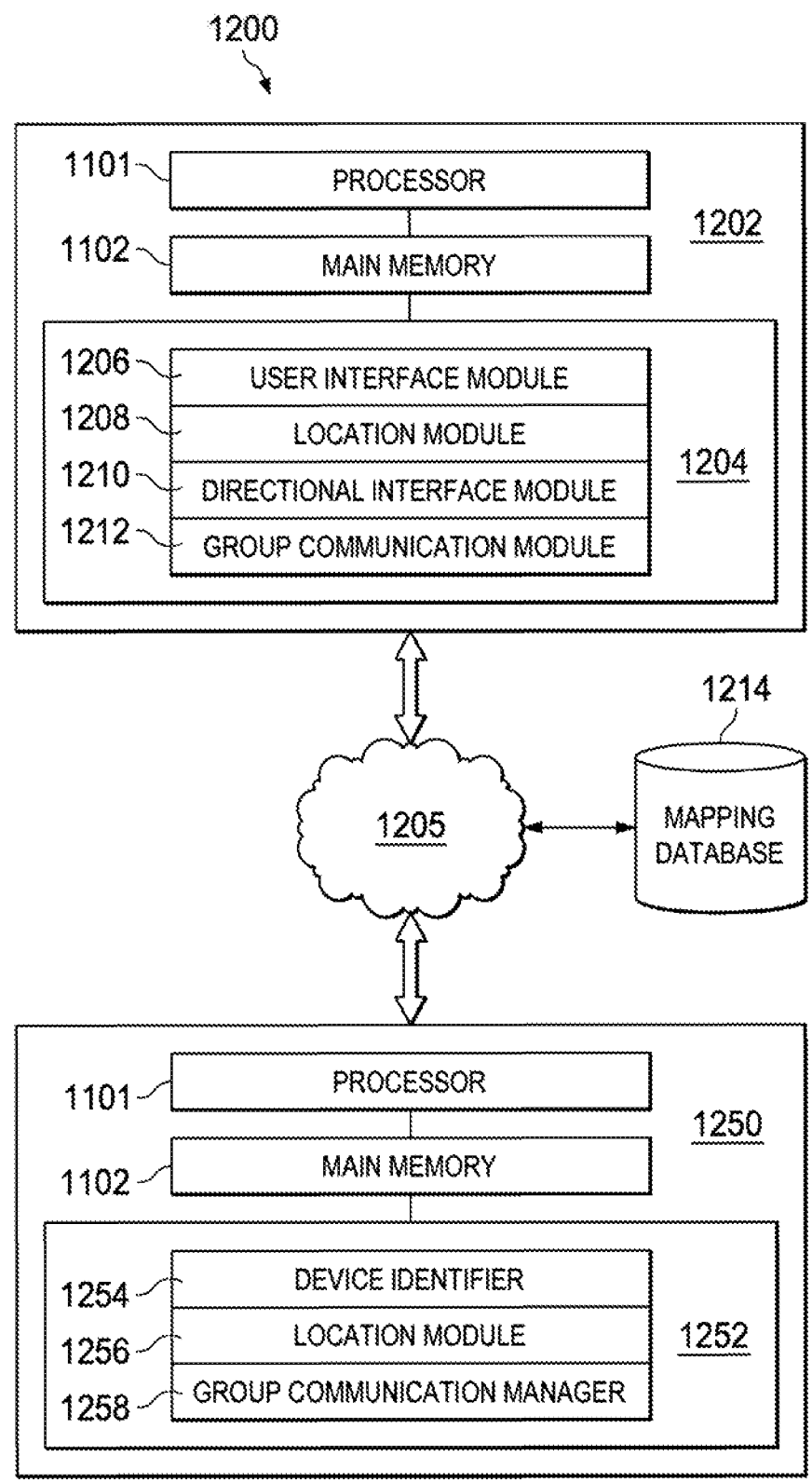
FIG. 12 is a pictorial representation of modules and components utilized within a communications system 1200 in accordance with an illustrative embodiment.

FIG. 12 is a pictorial representation of modules and components utilized within a communications system 1200 in accordance with an illustrative embodiment. FIG. 12 depicts components a client application 1204 executed on a user device 1202 for enabling communication via network 1205 with a server application 1252 executed on the server 1250. In the depicted embodiment, the user device 1202 includes a user interface module 1206, a location module 1208, a directional interface module 1210, and a group communication module 1212.

The user interface module 1206 includes instructions for generating a user interface or directional interface on the user device 1202 for enabling a user of the user device 1202 to interact with the client application 1204. For instance, the user interface module 1206 may include instructions for generating a directional interface that enables the user to input directional feedback and view data associated with the client application 1204. As an example, the user interface module 1206 may include instructions for generating a login page that requires a username and/or password for accessing a user account associated with the client application 1204. The user interface module 1206 may also include instructions or visual indicators for receiving user input via a touchscreen display device. In addition, in certain embodiments, the user interface module 1206 may include instructions for rotating a user interface based on the orientation of the user device 1202.

The location module 1208 may include instructions for reporting the location of the user device 1202 to the client application 1204, user interface module 1206, and server 1250. In one embodiment, the location module 1208 may include a GPS module (not shown) for determining location information of the user and periodically report the location information to the server 1250. The location module 1208 may also receive location information from the GPS module (not shown), determine if the location of the user device 1202 has changed from a last reported location, and transmit the location information only if the location information has changed. In another embodiment, the location module 1208 may determine or transmit the location information every time the location of the user device 1202 moves a specified distance (e.g., every 100 meters) or when the location of the user device 1202 becomes stationary for a specified time period (e.g., if the location of the device does not change for 5 minutes). Additionally, in some embodiments, the location module 1208 may include instructions for enabling a user to manually generate a report of a location to the server 1250 to report a user's location and/or to enable capturing of location information associated with a particular location.

The location module 1208 may also be configured to display location information associated with other users. The location module 1208 may also include a mapping module for displaying maps with interactive or real-time information, such as locations of other users, destinations, waypoints, points of interest, and so forth.

A mapping database 1214 may be utilized to provide mapping, location, and geographic information to the client application 1204 or the location module 1208. For example, the mapping database 1214 may provide commercial, private, or public information and applications regarding the location, directional heading, speed, altitude, and other geographic information of the user or other users. A web server (not shown) may host websites that provide content and other services to a user of the user device 1202 through the network 1205. The mapping database may communicate data and perform other features associated with the disclosed embodiments.

The group communication module 1212 includes instructions for receiving a communication group profile from the server 1250 and for connecting the user device 1202 with the members, devices, or applications associated with the communication group profile. The members of the group may be determined and restricted by the server 1250 to users that have been selected based on user input or a user profile. In one embodiment, the group communication module 1212 may receive instructions from the server 1250 to enable the group communication module 1212 to connect the user device 1202 to a group communication session such as, but not limited to, an audio communications (utilizing tones), directional communications sessions utilizing alternative signal or message types (e.g. texts, chats, emails, with audio messages), group communications, user-to user communications, or other forms of communications for exchanging directional information as well as location information for each user.

In some embodiments, the group communication module 1212 may also include instructions for enabling a user to request that a subgroup from the members of the communication group profile be generated or that a message only be sent to specified users. For example, a user may select members A, B, and C and request that the server 1250 form a separate communication group consisting only of the user and the selected members. In one embodiment, in order to form the requested subgroup, the server 1250 transmits a join request to each of the selected members requesting permission to join the selected member to the requested subgroup. In certain embodiments, the user and the selected members may be disconnected from the original communication group in response to the subgroup being formed. Alternatively, in some embodiments, the user and/or any of the members of the subgroup may be able to maintain multiple simultaneous communication sessions depending upon the features of the user device 1202 and/or depending upon a service agreement associated with the user device 1202. In another example, the client device 1202 may include indicators for receiving a selection of specific individuals to receive a command. For example, the user may select that users A, B, and C receive a command to bear left or West while users D and E bear North. This embodiment may be particularly useful for military applications. For example, a troop commander may utilize a device to visually, audibly, or tactilely guide each individual member of his troop using a single directional interface. The troop commander may also guide all members simultaneously.

Communications may begin when the client application 1204 is initiated on the user device 1202. This may simply be that the user opens up/launches the client application 1204 on the user device 1202. In some embodiments, the client application 1204 may require a user sign in to initiate the application, initiate a directions request, accept a request to receive directions, or accept a request to generate directions. In one embodiment, a direct or networked communications session may only be initiated if allowed to protect privacy and user location information. The communications sessions may also be set to expire after a time period, based on a predefined amount of inactivity, or so forth. The user device 1202 may communicate an identifier to the server 1250. The identifier may be associated with a particular user (e.g., a username/password, screen name, etc.) and/or may be associated with the user device 1202 (e.g., an IP address, MAC address, phone number, etc.).

Depending on the type of user device 1202 (dumb or smart), the user device 1202 may communicate directional feedback or location information to the server 1250. The directional feedback may be as previously described. For example, the directional feedback may be 2 or 3-D directions, speed or velocity commands, and other information. Similarly, the location information may be, but is not limited to, GPS coordinates, cellular tower coordinates, a name of a location (e.g., Madison Square Garden), and/or a street address. The location information may be transmitted automatically by the client application 1204 and/or may be initiated manually by a user.

In response to receiving the identifier and the location information, the server 1250 may communicate the directional feedback, identifier, location information, or a timestamp to one or more secondary users (not shown) through the network 1205 or to the mapping database 1214. The information received from the user device 1202 may be queued, stored, or archived according to user preferences, legal requirements, agreements, or a service contract. The user device 1202 may similarly receive directional feedback from one or more secondary users.

The device identifier module 1254, location module 1256, and group communication manager 1258 may be similar to the modules of the client device 1202. The device identifier 1254 may identify multiple devices that are communicating one with another. The device identifier 1254 may keep and store user profiles which may include identifying information, contact information, preferences, and other data and information. The location module 1256 may track current or past locations of the user. The location module 1256 may be utilized to determine one or more locations. The group communication module 1258 may coordinate or manage communications between a number of devices, simultaneously, concurrently, or sequentially.

The illustrative embodiments provide directional interfaces that may be utilized in remote locations, in highly networked areas, outdoors, or indoors. In one embodiment, the directional input may be saved for communication or playback at a later time.

The illustrative embodiments may take the form of an entirely hardware embodiment, an entirely software embodiment or an embodiment containing both hardware and software elements. Furthermore, the illustrative embodiments can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, or transport the program for use by or in connection with a device capable executing the program code.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method for providing directional feedback comprising:
    establishing a wireless connection between a first directional interface and one or more directional interfaces;
    receiving a free form path from a user utilizing the first directional interface providing instructions for one or more users utilizing the one or more directional interfaces,
        wherein the user utilizing the first directional interface is enabled to include both indoor paths and outdoor paths in the freeform path;
    converting the free form path to directional feedback for the one or more directional interfaces, including aligning, by the first directional interface, the free form path to available paths communicated as the directional feedback by the first directional interface for the one or more directional interfaces, wherein the available paths are enabled to be the indoor paths and the outdoor paths;
    sending the directional feedback to the one or more directional interfaces wirelessly,
    wherein user preferences stored by each of the one or more directional interfaces control how the directional feedback is presented at the one or more directional interfaces, wherein the user preferences stored by each of the one or more directional interfaces include two or more of a text instruction selection, an audio instruction selection, a tactile instruction selection, and a video instruction selection, and wherein the free form path is aligned to the available paths included in the directional feedback for presentation by the one or more directional interfaces.

2. The method of claim 1, wherein the first directional interface and the one or more directional interfaces include a plurality of direction indicators selectable by the user and the one or more users, respectively.

3. The method of claim 2, further comprising: communicating an indicator at the one or more directional interfaces in response to receiving the directional feedback.

4. The method of claim 3, wherein the indicator is one or more of an audio alert, tactile alert, or visual alert.

5. The method of claim 1, wherein the available paths include roads, trails, and paths.

6. The method of claim 1, wherein the directional feedback is sent as an encoded signal receivable by only the one or more directional interfaces.

7. The method of claim 1, wherein the directional feedback is displayed as part of a mapping interface.

8. The method of claim 1, wherein the directional feedback includes turn-by-turn instructions for the one or more users.

9. The method of claim 1, wherein the directional feedback is communicated visually, audibly, or tactilely in response to the user preferences associated with each of the one or more directional interfaces.

10. The method of claim 1, further comprising: receiving a selection of the one or more users associated with the one or more directional interfaces for sending and receiving directional feedback.

11. A directional interface, comprising:
a processor;
a display communicating a mapping interface, the mapping interface receives 1) a selection of one or more users utilizing one or more directional interfaces that a user utilizing the directional interface seeks to communicate with and 2) a free form path from the user utilizing the directional interface for the one or more users utilizing the one or more directional interfaces, wherein the user utilizing the directional interface is enabled to include both indoor paths and outdoor paths in the freeform path;
logic in communication with the display that converts the free form path to directional feedback for the one or more directional interfaces, including aligning, by the directional interface, the free form path to available paths of the mapping interface for presentation to the one or more directional interfaces, wherein the available paths are enabled to be the indoors paths and the outdoor paths; and
a transceiver that sends the directional feedback to the one or more directional interfaces wirelessly, wherein user preferences stored by each of the one or more directional interfaces control how the directional feedback is presented at the one or more directional interfaces, wherein the user preferences stored by each of the one or more directional interfaces include two or more of a text instruction selection, an audio instruction selection, a tactile instruction selection, and a video instruction selection, and wherein the free form path is aligned to the available paths included in the directional feedback for presentation by the one or more directional interfaces.

12. The directional interface of claim 11, wherein the directional interface is securely linked with the one or more directional interfaces to ensure privacy and secure communications, wherein the directional feedback is communicated by the transceiver utilizing user preferences, and wherein the user preferences include at least selections for at least text, audio, tactile, and video instructions.

13. The directional interface of claim 11, wherein the directional feedback lights up on the directional interface and the one or more directional interfaces in response to converting the free form path to the directional interface.

14. The directional interface of claim 11, wherein the mapping interface displays a location, speed, and heading of the one or more users.

15. The directional interface of claim 11, wherein the directional feedback includes turn-by-turn instructions for the one or more users.

16. The directional interface of claim 11, wherein the available paths include roads, trails, and paths.

17. A wireless device enabled with a directional interface, comprising:
a processor configured to execute a set of instructions; and
a memory configured to store the set of instructions, wherein the set of instructions are executed to:
establish a wireless connection between a directional interface and one or more directional interfaces;
receive a free form path from a user utilizing the directional interface to provide instructions for one or more users utilizing the one or more directional interfaces, wherein the user utilizing the directional interface is enabled to include both indoor paths and outdoor paths in the freeform path;
convert the free form path to directional feedback for the one or more directional interfaces, including aligning, by the directional interface, the free form path to available paths communicated as the directional feedback by the directional interface for the one or more directional interfaces, wherein the available paths are enabled to be the indoor paths and the outdoor paths; and
communicate the directional feedback to the one or more directional interfaces utilizing user preferences stored by each of the one or more directional interfaces, wherein the user preferences stored by each of the one or more directional interfaces control how the directional feedback is presented at the one or more directional interfaces, wherein the user preferences stored by each of the one or more directional interfaces include two or more of a text instruction selection, an audio instruction selection, a tactile instruction selection, and a video instruction selection, and wherein the free form path is aligned to the available paths included in the directional feedback for presentation by the one or more directional interfaces.

18. The wireless device of claim 17, wherein the directional interface is integrated with a mapping application displaying mapping information, and wherein the directional feedback lights up on the directional interface and the one or more directional interfaces in response to converting the free form path to the directional interface.

19. The wireless device of claim 17, wherein the directional interface compensates for delays in receiving a heading of the one or more users, wherein the heading includes a location, direction of travel, and a speed.

20. The wireless device of claim 17, wherein the directional feedback includes turn-by-turn instructions for the one or more users, wherein the available paths include roads, trails, and paths.

21. The directional interface of claim 11, wherein the directional feedback is converted to an encoded signal.

22. The directional interface of claim 11, wherein the transceiver sends a plurality of encoded signals to the one or more directional interfaces and receives a second plurality of encoded signals from the one or more directional interfaces, wherein the directional feedback is one of the plurality of encoded signals sent to the one or more directional interfaces.

* * * * *

UNITED STATES PATENT AND TRADEMARK OFFICE
CERTIFICATE OF CORRECTION

PATENT NO. : 10,830,601 B2
APPLICATION NO. : 15/350570
DATED : November 10, 2020
INVENTOR(S) : Tyrell Gray and Brian D. Owens Page 1 of 1

It is certified that error appears in the above-identified patent and that said Letters Patent is hereby corrected as shown below:

On the Title Page

Item (57), In the Abstract, Line 10, change "die" to --the--

In the Claims

Column 27, Claim 11, Line 42, change "indoors" to --indoor--

Signed and Sealed this
Twenty-second Day of December, 2020

Andrei Iancu
*Director of the United States Patent and Trademark Office*